US006674485B2

(12) United States Patent
Akiyama et al.

(10) Patent No.: US 6,674,485 B2
(45) Date of Patent: *Jan. 6, 2004

(54) APPARATUS AND METHOD FOR IMAGE COMPOSITING

(75) Inventors: Keiho Akiyama, Kanagawa (JP); Kou Otokozawa, Kanagawa (JP); Shigehiro Fukase, Kanagawa (JP); Naoto Baba, Kanagawa (JP); Yoshihiro Naitou, Kanagawa (JP); Tohru Baba, Kanagawa (JP)

(73) Assignee: Hitachi Software Engineering Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 96 days.

(21) Appl. No.: 09/384,933

(22) Filed: Aug. 26, 1999

(65) Prior Publication Data

US 2003/0133044 A1 Jul. 17, 2003

(30) Foreign Application Priority Data

Aug. 31, 1998 (JP) ............................................. 10-245879

(51) Int. Cl.[7] .............................. H04N 9/74; H04N 9/95
(52) U.S. Cl. ...................... 348/586; 348/590; 348/592; 348/593; 348/591
(58) Field of Search ................................. 348/586, 587, 348/590, 591, 592, 593; 345/41, 48, 63, 76, 84, 621–640; 382/167, 162, 164, 165; 396/2, 3, 4

(56) References Cited

U.S. PATENT DOCUMENTS

| | | | | |
|---|---|---|---|---|
| 4,589,013 A | * | 5/1986 | Vlahos et al. | 358/22 |
| 5,016,035 A | * | 5/1991 | Myles, Jr. | 396/2 |
| 5,177,283 A | * | 1/1993 | Ward | 585/446 |
| 5,487,145 A | | 1/1996 | Marsh et al. | |
| 5,515,109 A | | 5/1996 | Vlahos et al. | |
| 5,621,492 A | * | 4/1997 | Beveridge et al. | 396/2 |
| 5,630,037 A | | 5/1997 | Schindler | |
| 5,631,976 A | * | 5/1997 | Bolle et al. | 382/174 |
| 5,687,306 A | * | 11/1997 | Blank | 395/135 |
| 5,754,180 A | | 5/1998 | Kivolowitz et al. | |
| 5,760,781 A | | 6/1998 | Kaufman et al. | |
| 5,764,306 A | * | 6/1998 | Steffano | 348/586 |
| 5,778,258 A | * | 7/1998 | Zamoyski | 396/2 |
| 5,805,148 A | | 9/1998 | Swamy et al. | |
| 5,831,685 A | | 11/1998 | Vlahos et al. | |
| 5,835,104 A | | 11/1998 | Hicok et al. | |
| 5,867,166 A | | 2/1999 | Myhrvold et al. | |
| 5,870,103 A | | 2/1999 | Luo | |
| 5,886,818 A | | 3/1999 | Summer et al. | |
| 5,897,413 A | | 4/1999 | Erland | |
| 5,907,315 A | | 5/1999 | Vlahos et al. | |
| 5,914,748 A | | 6/1999 | Parulski et al. | |
| 5,917,549 A | | 6/1999 | Simons et al. | |
| 5,920,687 A | | 7/1999 | Winner et al. | |
| 5,939,246 A | | 8/1999 | Brewer et al. | |
| 5,974,198 A | | 10/1999 | Hamburg et al. | |
| 5,977,981 A | | 11/1999 | Brown | |
| 5,982,350 A | | 11/1999 | Hekmatpour et al. | |
| 5,982,381 A | | 11/1999 | Joshi et al. | |
| 5,986,718 A | * | 11/1999 | Barwacz et al. | 348/592 |

(List continued on next page.)

FOREIGN PATENT DOCUMENTS

JP 3034012 5/1991

*Primary Examiner*—John Miller
*Assistant Examiner*—Annan Q Shang

(57) ABSTRACT

The present invention provides an image compositing apparatus capable of producing a natural composite image, with a simple structure and a less occupying space. The present invention also provides a method for compositing an image by providing shadow-free conditions in a limited space for chroma-keying so that a subject image and a desired background image are naturally integrated as one image.

17 Claims, 31 Drawing Sheets

U.S. PATENT DOCUMENTS

| | | |
|---|---|---|
| 6,005,987 A | 12/1999 | Nakamura et al. |
| 6,011,595 A * | 1/2000 | Henderson et al. ......... 348/590 |
| 6,014,163 A | 1/2000 | Houskeeper |
| 6,020,931 A | 2/2000 | Bilbrey |
| 6,028,583 A | 2/2000 | Hamburg |
| 6,072,537 A * | 6/2000 | Gurner et al. ............... 348/586 |
| 6,081,275 A | 6/2000 | Kojima |
| 6,115,049 A | 9/2000 | Winner et al. |
| 6,148,148 A * | 11/2000 | Wain et al. ..................... 396/2 |
| 6,181,836 B1 | 1/2001 | Delean |
| 6,185,342 B1 | 2/2001 | Hamburg et al. |
| 6,191,797 B1 | 2/2001 | Politis |
| 6,198,489 B1 | 3/2001 | Salesin et al. |
| 6,211,941 B1 | 4/2001 | Erland |
| 6,215,503 B1 | 4/2001 | Snyder et al. |

\* cited by examiner

Before correction → After correction

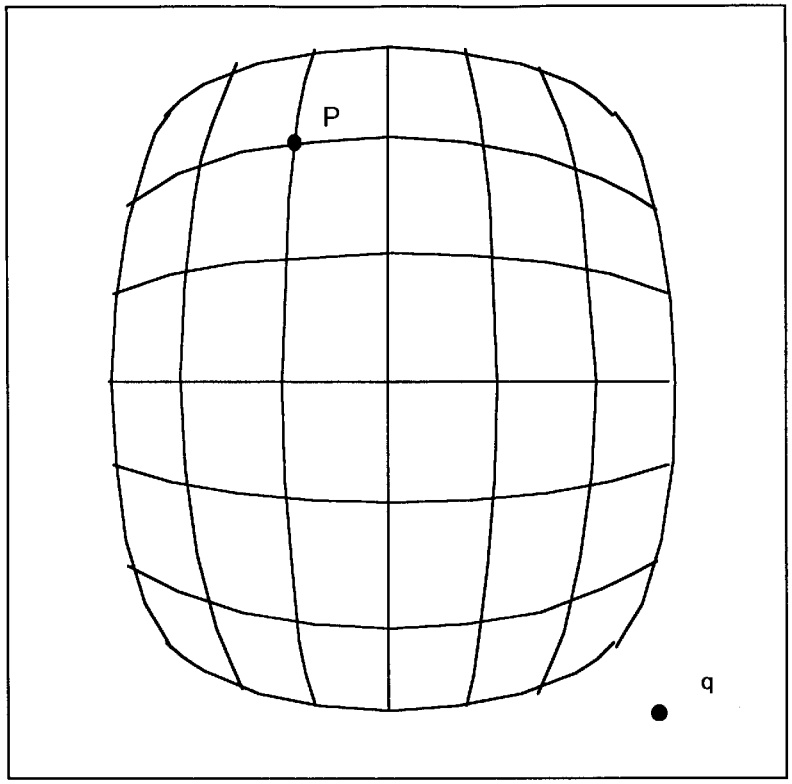
Fig.11A
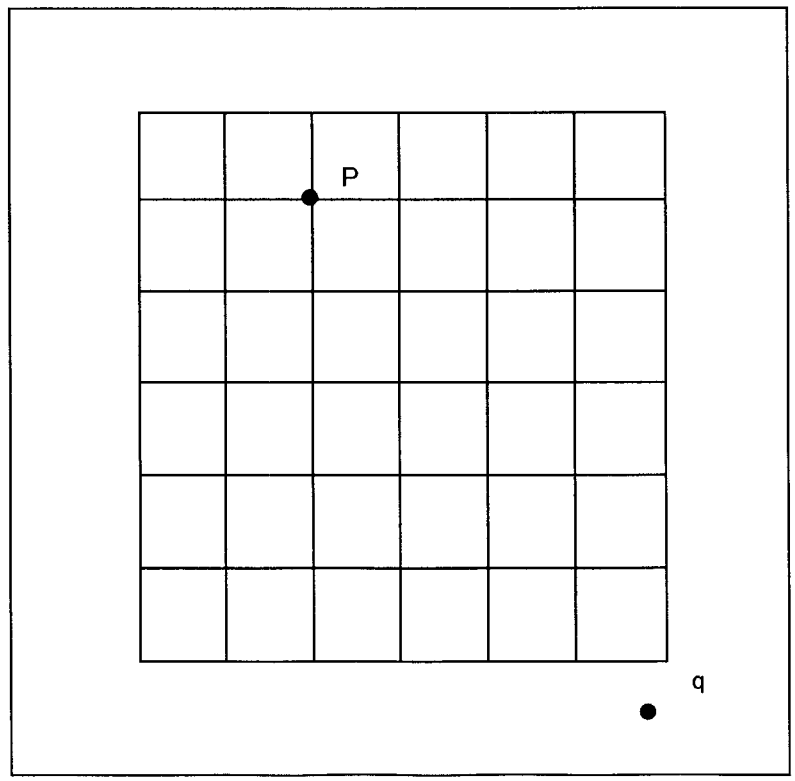
Fig.11B

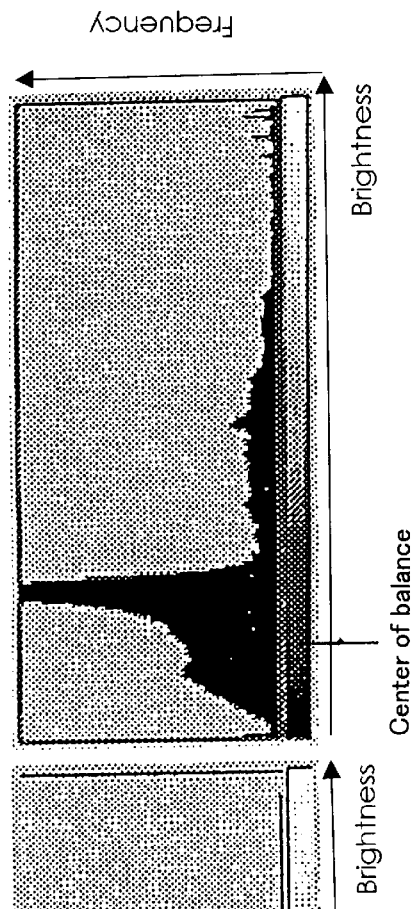
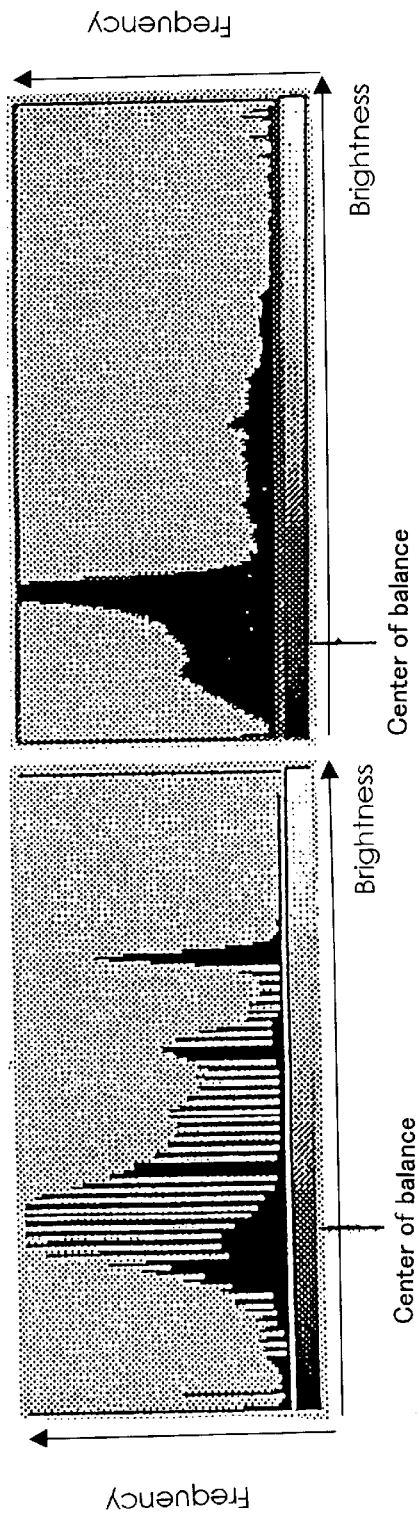
Fig. 15A Histogram of the selected background
Fig. 15B Histogram of the subject image
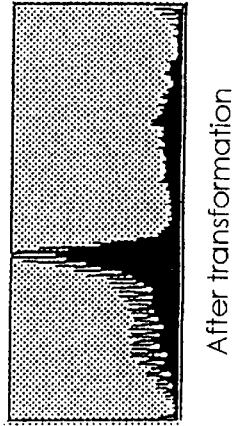
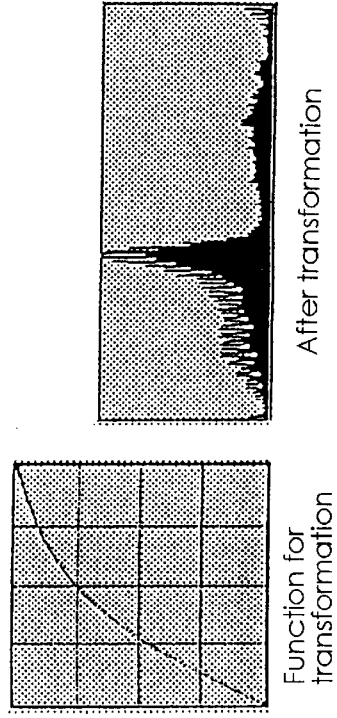
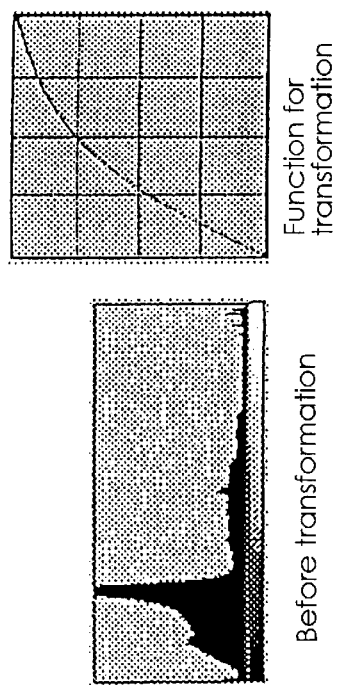
Fig. 16A Before transformation
Fig. 16B Function for transformation
Fig. 16C After transformation Fig. 17A
Fig. 17B
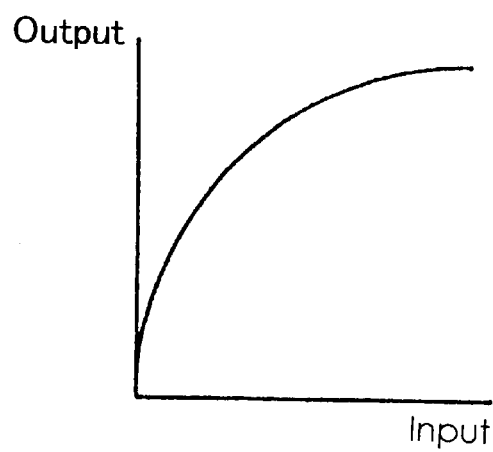
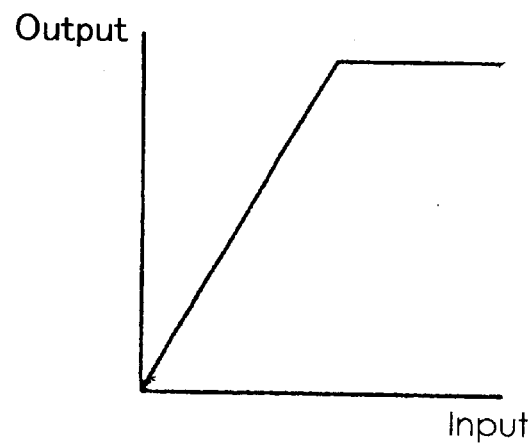
Functions for transforming histogram Expansion Contraction ○ White pixel ● Black pixel ○ White pixel
● Black pixel
Threshold value = 2

Inverted 2 pixels   threshold value

Function for hue transformation

To Fig.26

APPARATUS AND METHOD FOR IMAGE COMPOSITING

FIELD OF THE INVENTION

The present invention relates to an apparatus and a method for image compositing which give a realistic high resolution image with a simple structure.

BACKGROUND OF THE INVENTION

Image compositing systems are often employed in broadcasting studios and film studios. In particular, chroma-key image compositing system is employed for television programs such as weather programs and news programs, films using special effects, and the like. Specifically, the subject to be composited is filmed or photographed with a background that has as different (far) color as possible from the colors of the subject. By identifying the difference of hues between the subject image and the background image and through waveform processing, key signals indicating the contour information of the subject are generated. Using the key signals, a subject image of the original image and the insertion portion of the desired background image are cut out. Then, the desired background and the subject image are integrated to give a composite image.

FIG. 32 is a pictorial view showing a positional relationship of a plurality of light sources 3203, a subject (person) 3201 and a back screen 3202 for general chroma-key processing. For chroma-key image compositing processing, blue (which is a complementary color to a skin color) cloth or a large blue polyester board 3202 is used as a back screen behind the subject 3201 for taking a film or a picture with a camera 3200. The plurality of light sources 3203 are placed so as to cast multi-directional light upon the subject 3201.

An image printing apparatus usually found on streets is described in, for example, Japanese Utility Model No. 3,034,012. FIG. 33 is a block diagram showing a configuration of one of such image printing apparatuses. These apparatuses have a similar system to an easy photographing machine (so-called a fast photographing machine) which prints a photographic image on a printing paper. These image printing apparatuses simply provide a from-a-waist-up portrait of the user, or composite a portrait of the user with an already-prepared background pattern (e.g., printed with a designed background, a designed frame, or designed characters) and print out the composite image in the form of printed stickers. Such an on-street apparatus has a canopy-like curtain in front of its faces for preventing external light from entering into the apparatus during photographing.

The conventional image printing apparatus configured as shown in FIG. 33 is provided with a CPU 3301; a manipulating section 3302 consisting of, for example, a touch panel, buttons and a joy stick; an image inputting device 3303 with a CCD camera and the like; a display 3304 for displaying user's portrait (face image) and the like; a sound operator 3305 with a speaker and a sound ROM for producing synthesized sounds; a printer 3306 for printing a printing sheet or a sticker; a money control device 3307 with a coin selector and a coin detector for calculating the charge; a ROM 3308 for storing data of background patterns and compositing patterns, and a program for image compositing; an A/D converter 3310 for converting image signals of a user's portrait (taken with the image inputting device 3303) into digital image data; an I/O interface 3311 for storing the converted image data in an image memory 3309; a RAM 3312 for editing the image data and the like; a hard disc 3313 for storing various data and the like; and an auxiliary memory 3314.

Generally, chroma-key processing in a broadcasting studio or a film studio requires a blue back screen behind the subject, and numbers of multi-directional light sources to prevent the shadow of the subject from casting on the back screen. Accordingly, chroma-keying requires considerable cost and sufficiently large studio space to equip the studio with sufficient number of light sources. Thus, image compositing through chroma-keying has been difficult in schools and local TV stations (e.g., CATV) since they are not able to afford sufficient equipment or space required for chroma-keying.

Chroma-keying in a studio or the like also has a problem in that the lighting conditions and the brightness of the back screen change if the subject moves, which later results in a poor composite image.

One may consider employing chroma-key processing in a conventional image printing apparatus to make a composite image look less artificial. However, since the space of the apparatus is limited, it is impossible to provide a plurality of multi-directional lighting sources in the apparatus for a shadow-free background.

In order to overcome the above-described problems, troublesome countermeasures have been taken. For example, the distance between the subject and the back screen is set as far as possible; light is made to directly cast upon the back screen; the clothing of the subject is selected avoiding similar color to the back screen; and the ranges of hue, saturation and brightness of the key color are set as wide as possible.

Since the conventional image printing apparatus simply overlays the portrait image of the subject with the desired background image, the resultant composite image looks less natural in that the subject image is not blended into the background image but floating thereon.

Thus, the object of the present invention is to provide an image compositing apparatus capable of producing a natural composite image, with a simple structure and a less occupying space.

The other object of the present invention is to provide a method for compositing an image by providing shadow-free conditions in a limited space for chroma-keying so that a subject image and a desired background image are naturally integrated as one image.

SUMMARY OF THE INVENTION

According to one embodiment of the present invention, an image compositing apparatus with a fare adjustment function is provided, which takes a picture of a subject, composites a foreground (subject) image of the picture with a background image, and prints out the composite image with a printer. The apparatus comprises: light panels provided behind the subject and on the floor, which uniformly emit uniform light with predetermined hue, saturation and brightness; a means for measuring the hue, saturation and the brightness of the light panels provided behind the subject and on the floor; a memory for memorizing the hue, saturation and the brightness of the light panels provided behind the subject and on the floor; an image extracting means for extracting the foreground image of the picture based on a color of a light panel behind the subject; an image compositing means for comparing and correcting saturation, brightness and hue distributions of the foreground image with respect to saturation, brightness and hue distributions of the background image, and compositing the foreground image with the background image; and an image display for displaying the resultant composite image.

According to another embodiment of the invention, an image compositing method is provided for taking a picture of a subject, compositing a foreground (subject) image of the picture with a background image by chroma-keying, and printing out the composite image with a printer. The method comprises the steps of: extracting the foreground image; memorizing saturation, brightness and hue distributions of the background image; and correcting saturation, brightness and hue distributions of the foreground image with respect to the saturation, brightness and hue distributions of the background image.

BRIEF DESCRIPTION OF THE DRAWINGS

FIGS. 11A and 11B show the coordinates of the image before and after the correction, respectively;

FIGS. 15A and 15B are histograms showing distributions of the brightness of the selected background image and the subject image, respectively;

FIGS. 16A and 16C are histograms before and after the brightness transformation, respectively; FIG. 16B is a function f(x) for transforming the histogram;

FIGS. 17A and 17B show different functions for transforming brightness distributions;

DETAILED DESCRIPTION OF THE INVENTION

Hereinafter, the present invention will be described in more detail by way of examples with reference to the accompanying drawings.

Figure 1:
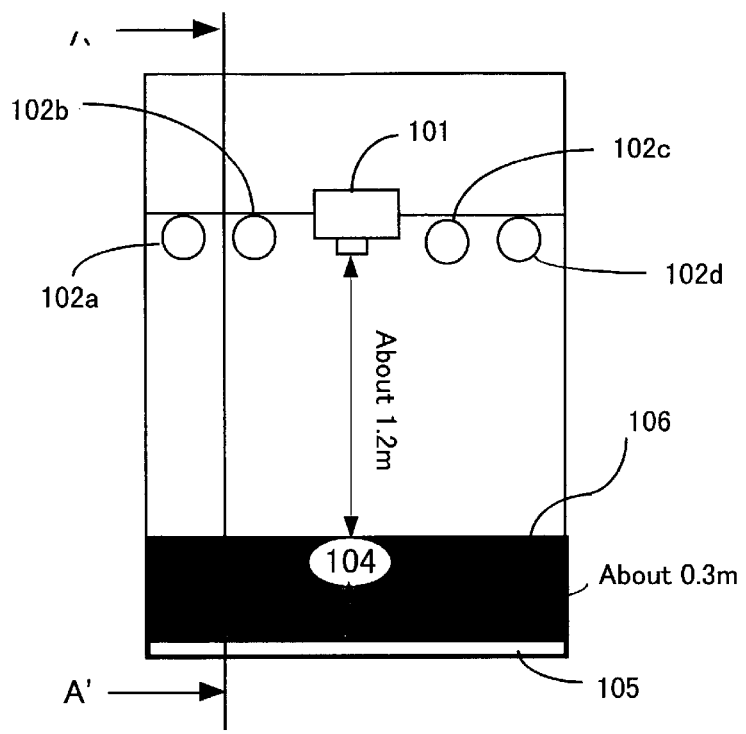
FIG. 1 is a plan view showing an interior of an apparatus of the invention.
Figure 2:
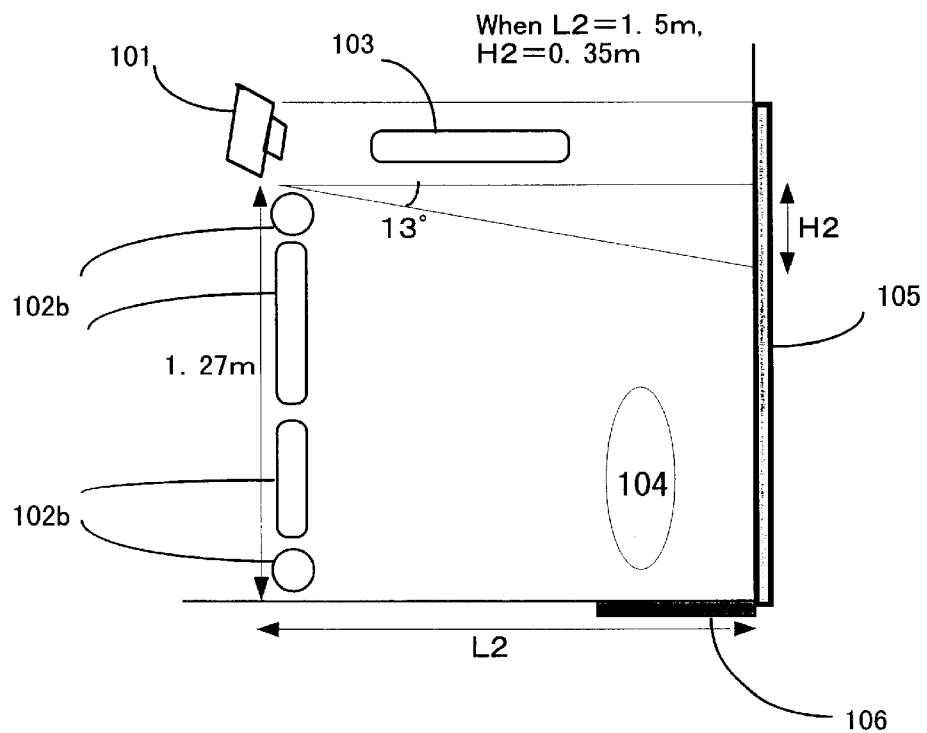
FIG. 2 is a cross-sectional view cut along line A—A' in FIG. 1.

A basic structure of an apparatus of the present invention is shown in FIGS. 1 and 2. FIG. 1 is a plan view showing an interior of an apparatus of the invention. FIG. 2 is a cross-sectional view cut along line A—A' in FIG. 1.

A camera 101 (FIG. 2) is set on an upper position of the interior of the apparatus so that it can take the whole body of a subject (person) 104. Light sources 102a–102d (FIG. 1) in front of the subject and a light source 103 (FIG. 2) on the ceiling are provided for lighting the subject 104. Flat luminous boards 105 and 106 are provided behind the subject and on the floor, respectively, to prevent the shadow of the subject 104 from casting on the back screen and the floor during the shooting stage.

Although the numerical values indicated in FIGS. 1 and 2 are desirable values for preventing shadows, they may be suitably changed according to the size of the person 104, the size of the exterior housing and the illuminance of the light sources.

Figure 3:
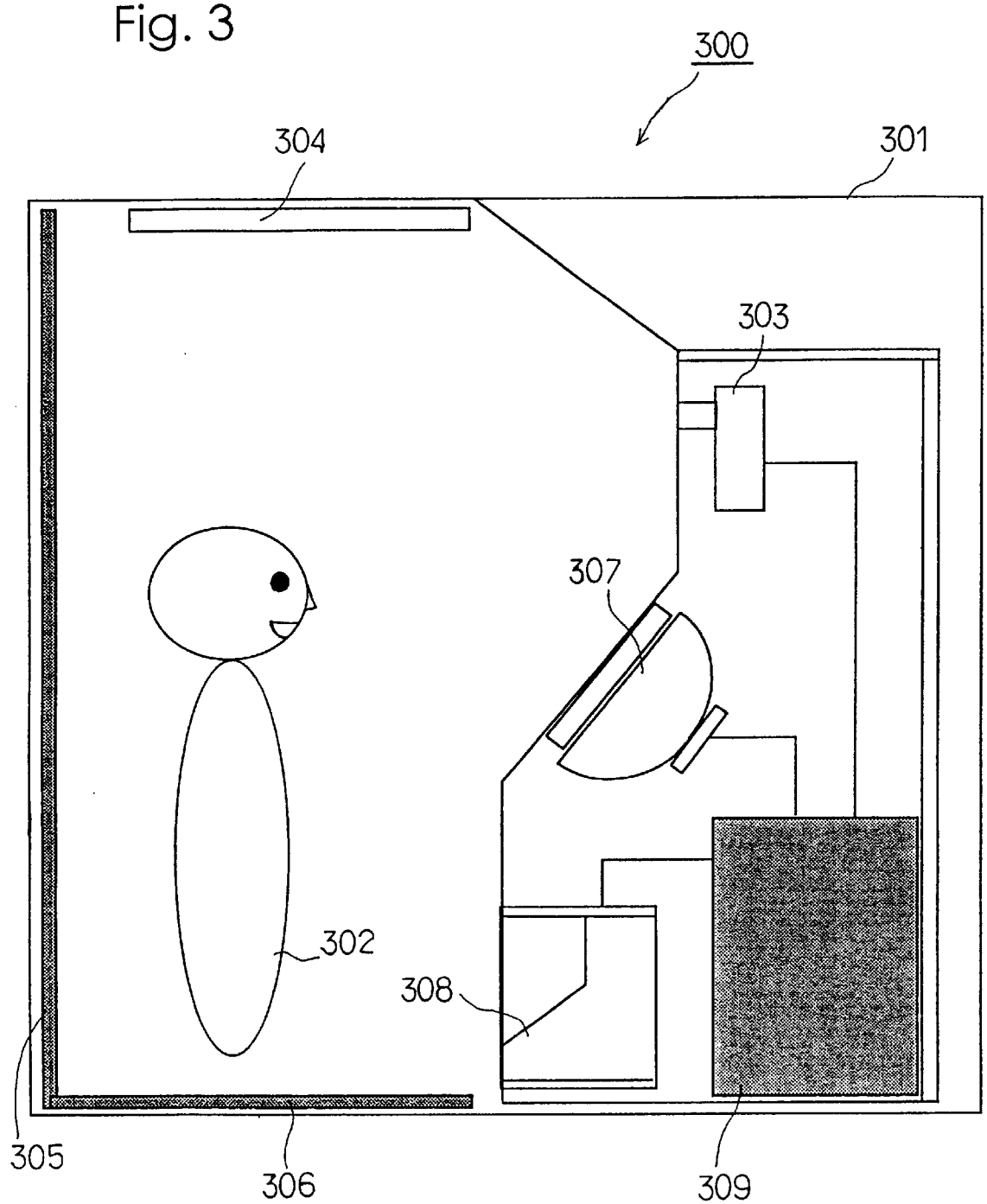
FIG. 3 is a brief cross-sectional view showing an interior of an exemplary image compositing apparatus.

FIG. 3 is a brief cross-sectional view showing an interior of an exemplary image compositing apparatus 300 having the above-described structure. In an exterior housing 301, a camera 303 is set on an upper position of the apparatus 300 so that it can take a picture of the whole body of a subject (person) 302. A light source 304 and other light sources (which are not shown in FIG. 3 for the sake of simplicity) are provided on the ceiling and in front of the subject 302, respectively, to cast light on the subject 302. Flat luminous boards 305 and 306 (equivalent to the flat luminous boards 105 and 106 shown in FIGS. 1 and 2) are provided behind the subject 302 and on the floor, respectively.

Preferably, the flat luminous board 305 behind the subject 302 is of a height sufficiently taller than the height of the person 302. To eliminate a shadow to cast on the floor in the vicinity of the subject's feet, the flat luminous board 306 preferably extends for at least 30 to 50 cm from the back of the exterior housing 301.

A display device 307 for displaying a composite image that also functions as a touch panel display is provided underneath the camera 303. Further beneath, a printer 308 is provided for printing out the composite image. A controller 309 for controlling the entire apparatus 300 (e.g., controlling image compositing) is provided behind the display device 307.

Figure 4:
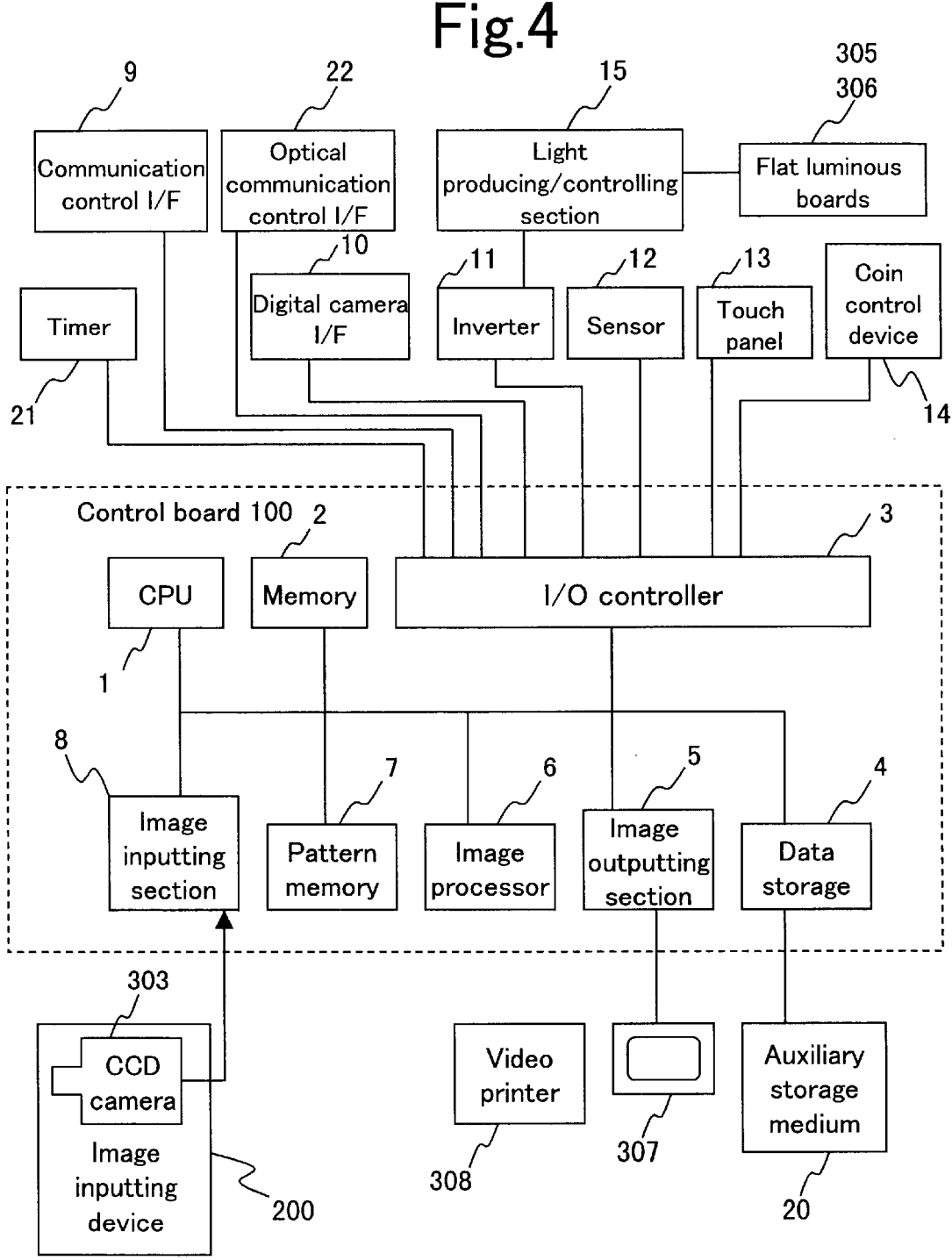
FIG. 4 is a block diagram showing a functional configuration of the exemplary image compositing apparatus shown in FIG. 3.

FIG. 4 is a block diagram showing a functional configuration of the image compositing apparatus 300 shown in FIG. 3.

The exemplary image compositing apparatus 300 includes a CPU (Central Processing Unit) 1 for controlling the entire apparatus. The CPU 1 is connected to a memory 2, an I/O controller 3, a data storage 4, an image outputting section 5, an image processor 6, a pattern memory 7 and an image inputting section 8.

The I/O controller 3 is connected to and controls a communication control I/F (interface) 9, a digital camera I/F 10, an inverter 11, a sensor 12, a touch panel 13, a coin control device 14 and a timer 21.

The data storage 4 sends/receives various data to/from an auxiliary storage medium 20 (e.g., a floppy disk). The image outputting section 5 is connected to a video printer 18 and the display 307.

The I/O controller 3 controls the inverter 11 to apply a voltage to the flat luminous boards 305 and 306 via a light producing/controlling section 15, thereby producing uniform light from the luminous boards 305 and 306. The light producing/controlling section 15 also controls light emitted from the light sources in front of the subject 302.

The image inputting section 8 converts an image data taken by the CCD camera 303 from analog signals to digital signals with an A/D converter (not shown).

The CCD camera 303 is equipped with a wide-angle lens that allows a wide shooting range (in both vertical and horizontal directions) in short distance. The CCD camera 303 also measures hues, saturation and brightness of the light of the flat luminous boards 305 and 306.

Compressed digital signals from the image inputting element 200 and the digital camera I/F (interface) 10 are sent to the CPU 1, whereby the CPU 1 extracts the contour of the subject image and corrects the distortion of the subject image. The CPU 1 further compares and corrects the hues, the brightness and the saturation of the subject image with respect to those of the back screen color (i.e., the color of the flat luminous boards 305 and 306). Then, the CPU 1 composites the subject image with a desired image according to the program stored in the memory 2. The resultant composite image is printed out by the video printer 308. The data may be stored in the auxiliary storage medium 20 (e.g., a floppy disc, a PD or an MO) while data like personal data (e.g., an image of the user, name, and phone number entered by the user via an inputting device (touch panel 13)) are encrypted according to an encryption program (e.g., PGP).

The memory 2 stores the image data from the image inputting section 8, and instructions sets for controlling the CPU 1 and for controlling the processing by the image compositing apparatus 300. The memory 2 also temporarily stores processing data of the CPU 1 as work data.

Data of hue, saturation and brightness of the flat luminous boards 305 and 306 are also stored in the memory 2.

The pattern memory 7 stores data of background patterns to be overlaid with subject image, and data of manipulation guide menu displayed on the display 307. The data in the pattern memory 7 is rewrittenable by using the data storage 4.

The communication control I/F 9 is used for connecting the apparatus of the present invention with an external network (an external management server) via a private line. The apparatus management server (not shown) is provided for handling a failure of the apparatus.

Moreover, the management server is used for sending new background patterns and character designs to the data storage 4 via the I/O controller 3. The data storage 4 compares the date of the data sent from the management server with the data in the pattern memory 7. If the data in the storage unit 4 is up to date, the data in the pattern memory 7 is rewritten by that data.

The touch panel 13 is provided on the surface of the display 307 such that, for example, the user may input their choices by directly touching a manipulation screen displayed on the display 307. For example, when the user touches the manipulation screen on the display 307, the CPU 1 detects the resistance on the screen via the A/D converter and calculates the coordinates of the pressed point, thereby determining the button that the user has selected.

The sensor 12 detects the presence of the user at the manipulating position, for example, by an IR sensor and confirms whether the user is standing on a predetermined point after he/she has inserted coins, or detects whether one or a plurality of users are present.

Under the control of the CPU 1, the coin control device 14 detects insertion of coins and checks that there is no insertion of fake coins. The coin control device 14 determines whether the coin is real or not by measuring the size and the weight of the inserted coins. If the coin is determined to be a fake coin, the coin control device 14 further examines the surface designs of the coin and again determines whether the coin is real or not.

The inverter 11 prevents flickering of the light of the flat luminous boards 305 and 306. The anti-flickering cycle may be changed manually depending on the light condition outside the exterior housing 301. The light producing/controlling section 15 controls the light by controlling a phase control angle of a voltage applied to the flat luminous boards 305 and 306.

The flat luminous boards 305 and 306 may be made from, for example, an EL boards or PIS. The entire surface of the flat luminous boards 305 and 306 may be covered with, for example, blue or green film so that they produce light with a hue other than white or skin colors. To prevent light from being reflected off the luminous boards 305 and 306, the flat luminous boards 305 and 306 may have an acrylic surface or a bead-like surface.

The image processor 6 extracts the contour of the subject's portrait based on the data of the photographed image stored in the memory 2 and based on the face color data stored in the pattern memory 7. Then, the image processor 6 (in cooperation with the CPU 1 or by itself) places the contour of the image at a prescribed location of the memory space (the memory 2) and composites the image with a desired background image. The composite image data is sent to the video printer 18, which prints out the composite image in the form of post cards or stickers.

A timer 21 is provided when the apparatus 300 cannot be connected to an external management server via a private line. The timer 21 operates under the control of the CPU 1.

An optical communication control I/F 22 may be provided for an IR communication with Ir-DA, and an optical fiber communication. By using this interface 22, the apparatus 300 can directly be connected to a portable information terminal (e.g., PDA), a laptop personal computer or the like for exchanging binary data (e.g., programs or data used in the image compositing apparatus 300 of the invention). Furthermore, data or program created by such personal computer may be uploaded to the image compositing apparatus 300 to exchange the background patterns and character designs.

Once the user inserts coins, the display 307 gives a sign for taking a photograph and the user is photographed with the CCD camera 303. Other than the CCD camera 303, a C-MOS-loaded camera, a normal video camera or the like may be used. A photograph of the subject 302 is taken by the CCD camera 303 while controlling the exposure by an AE (Automatic Exposure) function of the CCD camera 303. The photographed image is stored in the memory 2.

Alternatively, for example, a digital still camera having an Ir-DA optical communication function may be used in place of the CCD camera 303. In this case, the digital still camera is provided with a buffer memory that has an Ir-DA optical communication function for receiving and transferring the already taken image data, and that is capable of storing a plurality of image data, to allow a plurality of JPEG-compressed still pictures to be readily composited upon user's selection.

When the sensor 12 detects that the user is standing in front of the manipulation panel, it generates a detection signal for telling the CPU 1 to switch the screen of the display 307 from a demonstration screen to a manipulation guide screen. Upon insertion of the coin, the flat luminous boards 305 and 306 become ready to synchroflash with the snap of the shutter, i.e., to flash upon photographing. The flat luminous boards 305 and 306 may be switched on when the user has inserted the coin.

Although the payment is controlled by the coin control device 14 in the image compositing apparatus 300, a money receiving device is not limited to a coin detector and may be a note reader, a prepaid card reader, a credit card reader or the like.

The photographed image data is converted into RGB data and displayed on the display 307 via the image outputting section 5. A suitable image resolution of the display 307 is, for example, 320×240 pixels/screen.

The screen on the display 307 of the image compositing apparatus 300 asks the user to confirm whether the resultant composite image is the desired one or not.

Such manipulation screens are controlled and displayed by the CPU 1. Since the operation of the screen display and the operation of the image processing are managed by the CPU 1, the display screen may be switched to other images stored in the pattern memory 7 during the printing process.

When the operation guide screen is not necessary, the screen may run commercial messages, advertisements and the like. The display 307 is not limited to a CRT display, and it may be, for example, an LCD device or a display device employing LED.

Referring to FIG. 4, the circuit block surrounded by a broken line is formed on a semiconductor substrate or a glass epoxy substrate by a known applied semiconductor IC technique and is installed in the controller 309 shown in FIG. 3.

Figure 5:
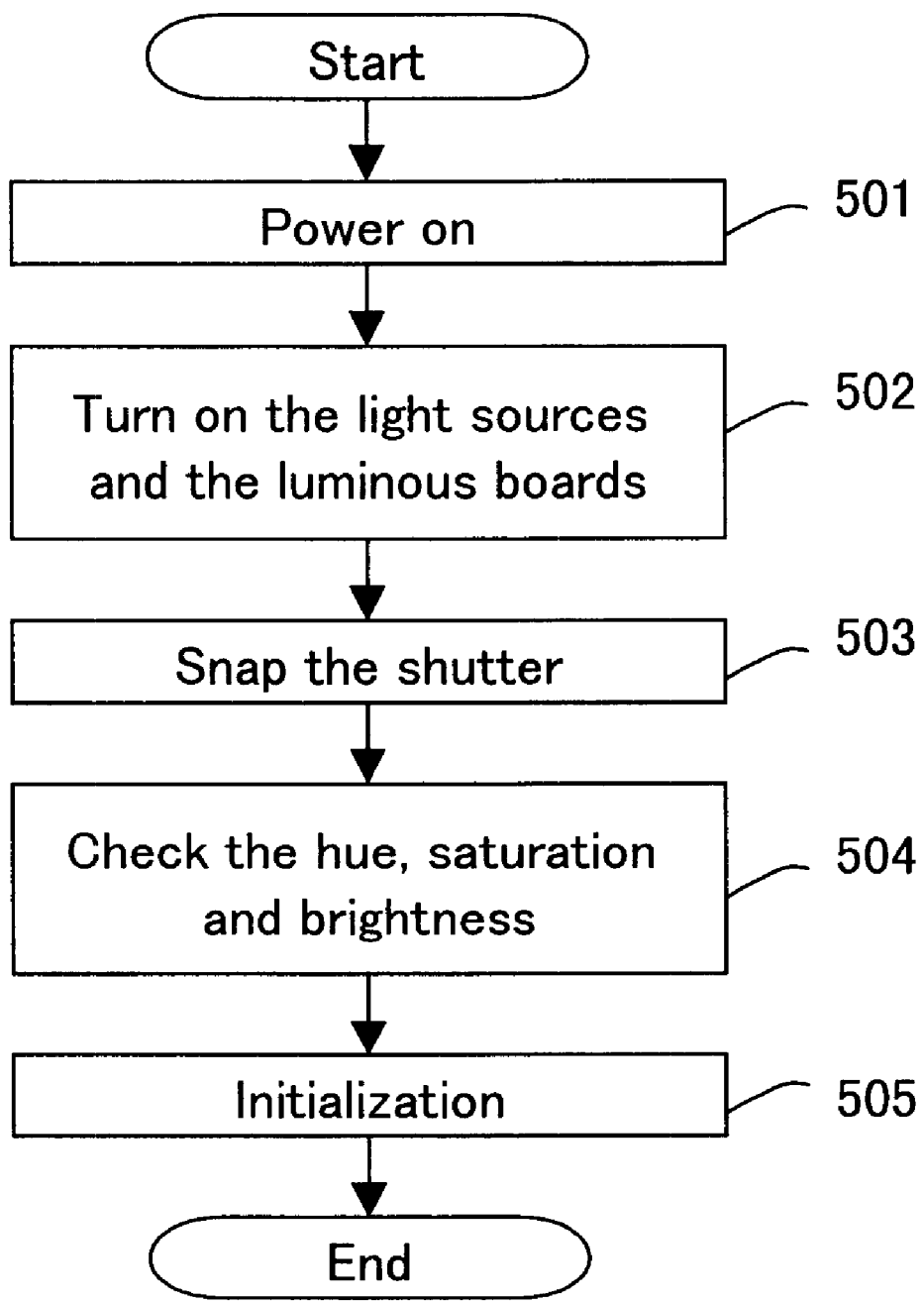
FIG. 5 is a flow chart illustrating steps for initializing the apparatus of the present invention.

FIG. 5 is a flow chart illustrating steps for initializing the hue of the flat luminous boards 305 and 306 according to the present invention.

When the power of the apparatus 300 is turned on (e.g., in the morning) (step 501), a voltage is applied to the light sources in front of the subject's standing position, to the light source 304 on the ceiling, and to the flat luminous boards 305 and 306, thereby turning them on (step 502).

After the flat luminous boards 305 and 306 are turned on, the CCD camera 303 automatically snaps the shutter to measure the hue, the saturation and the brightness of the flat luminous boards 305 and 306 (step 503). The data of the measured hue, saturation and brightness are memorized (step 504) so that they can be used for adjusting the predominant color of the blue background to be cut out upon chroma-keying. The information of hue, saturation and brightness is registered in the memory 2, thereby completing the initialization (step 505).

Figure 6:
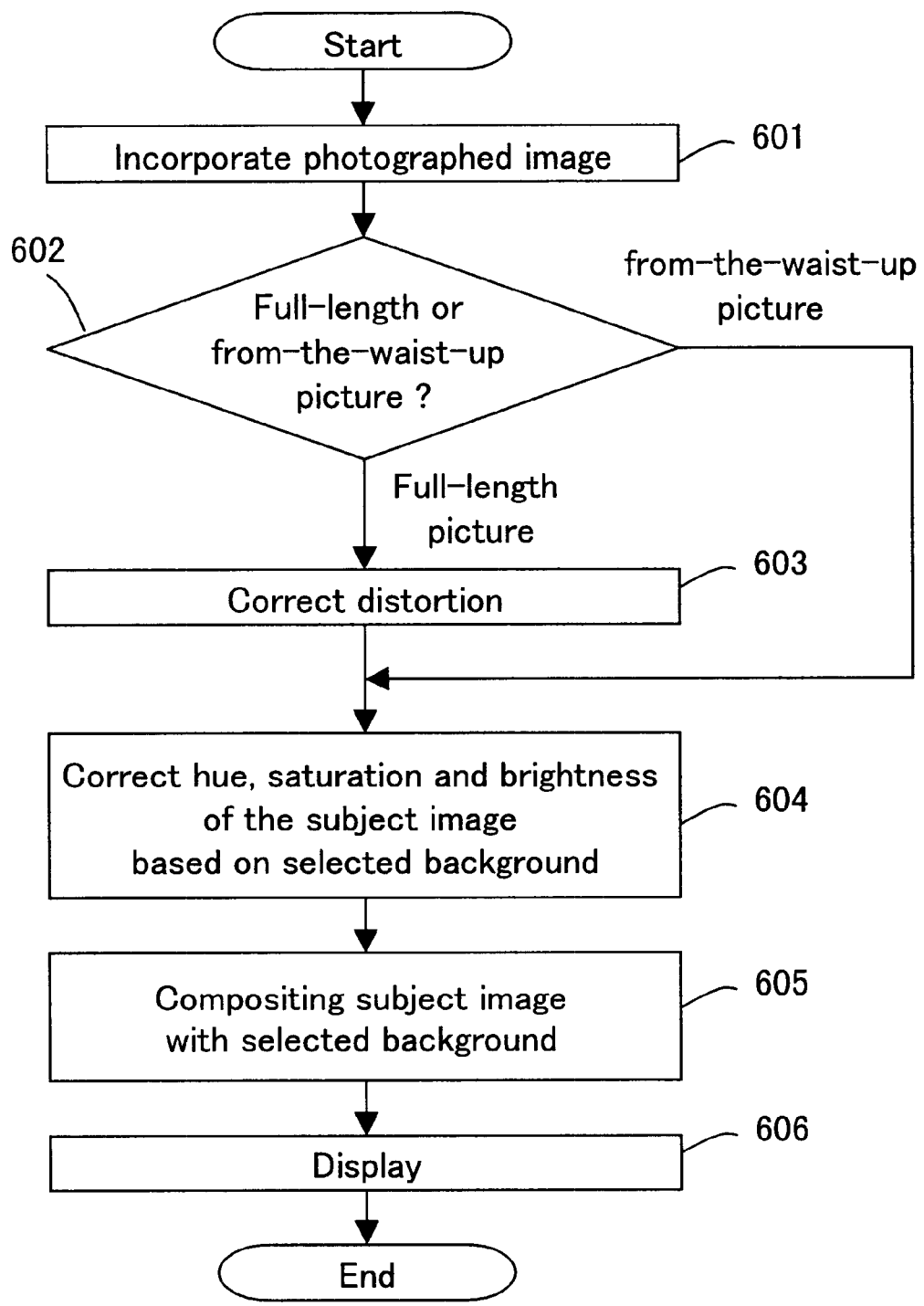
FIG. 6 is a flow chart illustrating steps for processing a composite image according to the invention.

FIG. 6 is a flow chart illustrating steps for processing a composite image according to the invention.

First, a photographed image is incorporated into the memory 2 (step 601). According to the user's selection between a full-length picture and a from-the-waist-up picture, distortion of the image is corrected (step 602). If the user has selected a full-length picture, the distortion that gives an unnatural look to the image is corrected (step 603). If the user has selected a from-the-waist-up picture, step 603 is skipped. The hue, saturation and brightness of the subject image is compared to and corrected to match those of the selected background (step 604). After the correction, the image of the subject is composited with the selected background (step 605). The resultant composite image is displayed (step 606) and printed out.

Hereinafter, the correction of image distortion will be described with reference to FIGS. 7 to 11.

Since a full-length picture is taken in short distance in the image compositing apparatus 300 of the invention, the CCD camera 303 employs a wide angle lens. The use of the wide angle lens in short distance causes the optical axis of the lens to be incident on the subject in a non-vertical angle that results in distortion where the area of the image corresponding to the center of the lens is unnaturally magnified. Distortion of the image is not only caused by the distortion aberration of the lens but for various reasons. Therefore, a corrected coordinate system cannot be defined by a simple function.

Generally, a geometric transformation of an image is conducted by finding and applying a value of a corresponding pixel in the photographed image to each of pixels in a transformation image, based on a transformation equation. However, some pixels of the photograph image may not exactly correspond to the pixels of the corrected image, or more than one pixels of the photograph image may correspond to a single pixel of the corrected image. Thus, the values of such pixels are obtained through a gray level interpolation.

The "gray level interpolation" determines a gray level value of given coordinates through linear interpolation based on the distance ratio of the four nearest pixels surrounding the coordinates.

According to the present invention, first, corresponding points between the photographed image and the transformation image are obtained based on the collection of pairs of coordinates $P_n(X_n, Y_n)$ on the photographed image and the collection of pairs of corresponding coordinates $P'_n(X'_n, Y'_n)$ on the transformation image. Then, the linear interpolation and the gray level interpolation are applied to these points to correct the unnaturally distorted image into an image with a realistic look.

Figure 7:
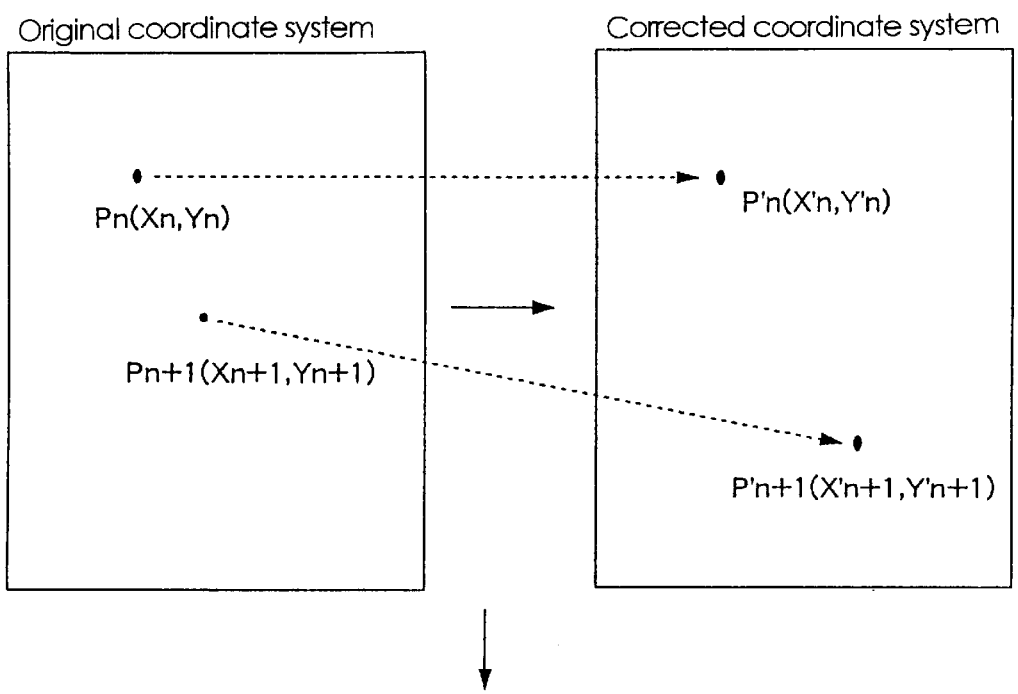
FIG. 7 illustrates corresponding points between an original image coordinate system and a corrected coordinate system.
Figure 8:
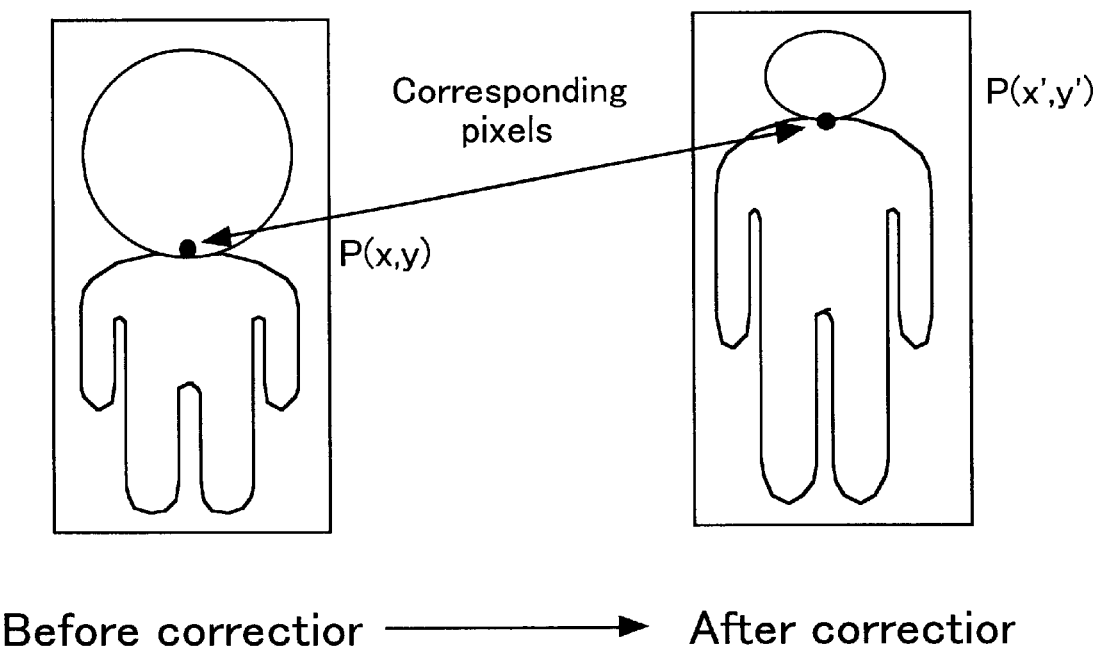
FIG. 8 illustrates images before and after the correction according to the present invention.
Figure 9:
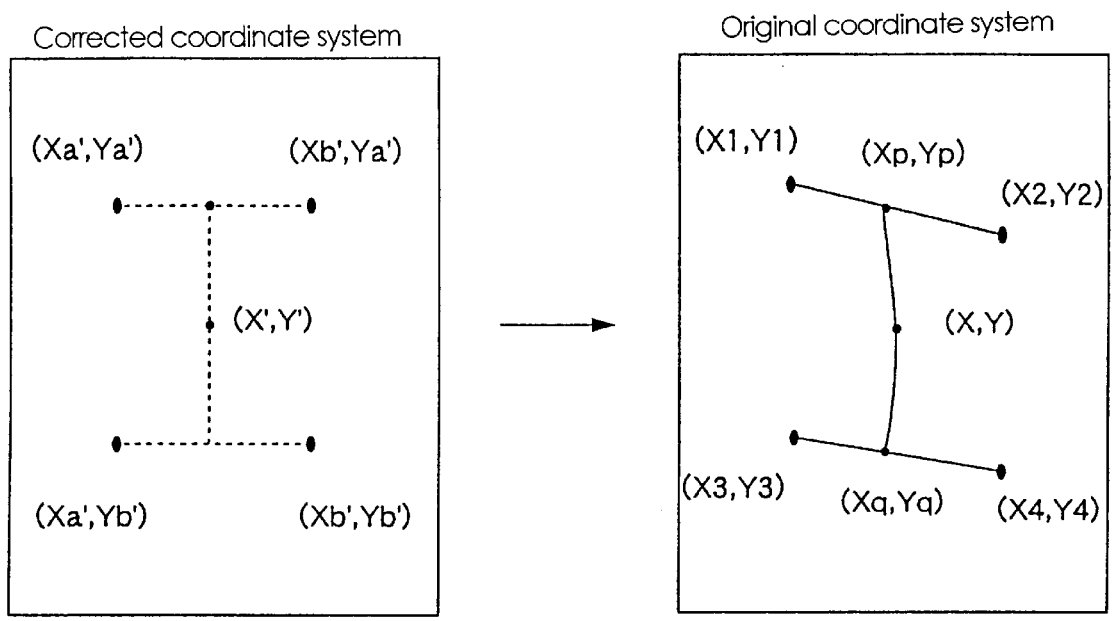
FIG. 9 illustrates corresponding coordinates between the original image coordinate system and the corrected coordinate system.

FIG. 7 illustrates corresponding points between the original coordinate system and the corrected coordinate system. FIG. 8 shows images before and after the correction. FIG. 9 illustrates corresponding coordinates between the original image coordinate system and the corrected coordinate system.

According to the present invention, the entire transformation data for the original coordinates and the corrected coordinates shown in FIG. 7 are obtained. Based on this transformation data, coordinates (x, y) on the original image coordinate system that corresponds to the corrected coordinates (X',Y') on the corrected coordinate system are obtained.

First, the corrected coordinate system is obtained from the original coordinate system by using the transformation data. Then, the probable four nearest points of the corrected coordinates (X',Y') and the probable four nearest points of the photograph coordinates are obtained.

Herein, the corrected coordinates (X',Y') are assumed to be aligned on the grid. From the four nearest coordinates on the corrected coordinate system, coordinates $(X_p, Y_p)$ and $(X_q, Y_q)$ on the original coordinate system (FIG. 9) are obtained by the following equations:

$$Xp = X1 + (X2 - X1)(X' - Xa')/(Xb' - Xa')$$

$$Yp = Y1 + (Y2 - Y1)(Y' - Ya')/(Yb' - Ya')$$

$$Xq = X3 + (X4 - X3)(X' - Xa')/(Xb' - Xa')$$

$$Yq = Y3 + (Y4 - Y3)(Y' - Ya')/(Yb' - Ya')$$

Then, the coordinates (X, Y) corresponding to (X', Y') is obtained based on the coordinates $(X_p, Y_p)$ and $(X_q, Y_q)$ as follows:

$$X = Xp + (Xq - Xp) \times (Y' - Ya')/(Yb - Ya')$$

$$Y = Yp + (Yq - Yp) \times (X' - Xa')/(Xb - Xa')$$

Figure 10:
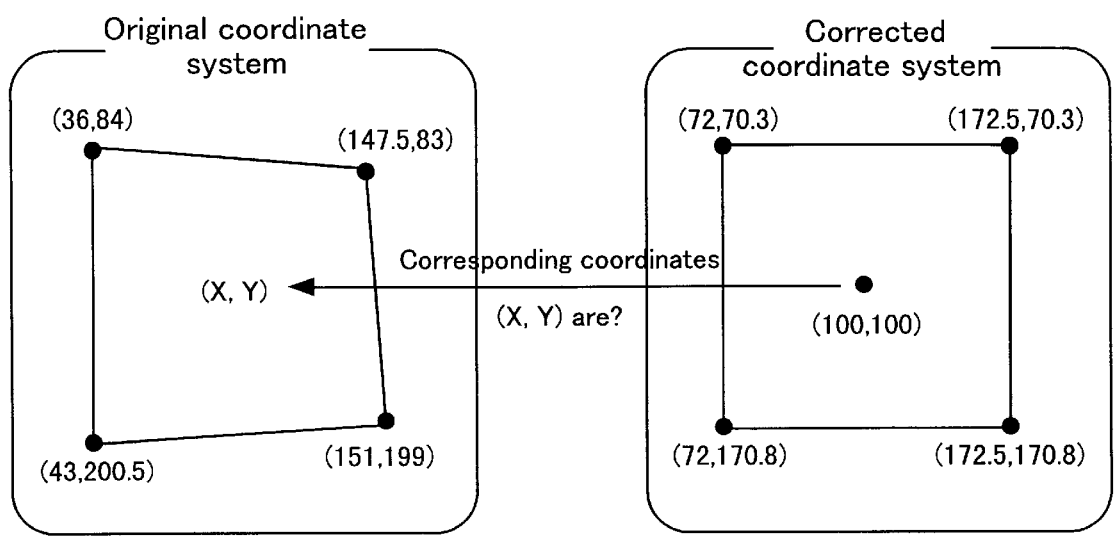
FIG. 10 illustrates an example of a coordinate transformation.

FIG. 10 illustrates an example of the linear interpolation. The original coordinates (X, Y) corresponding to (100, 100) on the corrected coordinate system shown in FIG. 10 are calculated as follows:

$$\frac{(X' - X_a')}{(X_b' - X_a')} = \frac{100 - 72}{172.5 - 72} = \frac{28}{100.5} = 0.2786$$

$$\frac{(Y' - Y_a')}{(Y_b' - Y_a')} = \frac{100 - 70.3}{170.8 - 70.8} = \frac{29.7}{100} = 0.297$$

$$Xp = 36 + (147.5 - 36) \times 0.2786 = 67.06$$

$$Yp = 84 + (83 - 84) \times 0.297 = 83.703$$

$$Xq = 43 + (151 - 43) \times 0.2786 = 73.09$$

$$Yq = 200.5 + (199 - 200.5) \times 0.297 = 200.0545$$

$$X = 67.06 + (73.09 - 67.06) \times 0.297 = 68.85091 \approx 68.85$$

$$Y = 83.71 + (200.06 - 83.71) \times 0.2786 = 116.1185279 \approx 116.12$$

$$(X, Y) = (68.85, 116.12)$$

Accordingly, the gray level of the corrected coordinates (100, 100) is calculated based on the gray levels of the four nearest coordinates (68, 116), (68, 117), (69, 116) and (69, 117) of the corresponding coordinates (X, Y)=(68.84, 116.13) by linear interpolation.

FIG. 11A shows the coordinates of the original photographed image before the correction; and FIG. 11B shows the coordinates of the image after the correction.

Since the gray levels are only defined for those on the grid, gray levels of those that are not on the grid are obtained by interpolating the gray levels of the nearest coordinates.

Hereinafter, image compositing will be described in more detail with reference to FIG. 12.

A center point of the photographed subject image is determined for distortion correction, and the subject image is positioned relative to the desired background pattern (step 1201). Then, the contour of the positioned subject image is cut out (step 1202). Based on the cut out contour and the center coordinates, a region of the subject image where the skin color is most widely distributed is determined to determine the hue, the saturation and the brightness of the skin color (step 1203).

The determined hue, saturation and brightness are compared with those of the background image selected by the user (step 1204). Based on the comparison, the hue, the saturation and the brightness of the subject image are corrected to the values of the selected background (step 1205). Once the correction is completed, the subject image and the selected background image are composited.

The steps of image compositing shown in FIG. 12 will be described in more detail.

To obtain a realistic composite image of a subject image and a background image, it is requisite:

(i) that the light sources are correctly positioned;

(ii) that the position and the size of the person are correct;

(iii) that the hues, the saturation and the brightness match between the subject image and the selected background are matched; and (iv) that the contour of the person is blurred.

As to condition (i), the positions of the light sources in the image compositing apparatus are usually already optimally determined. As to condition (ii), it is impossible to automatically determine the position and the size relative to the selected background image for every individual user. Accordingly, every selected background images have fixed positions suitable for superimposing the subject image. Conditions (iii) and (iv) will be described later.

Figure 13:
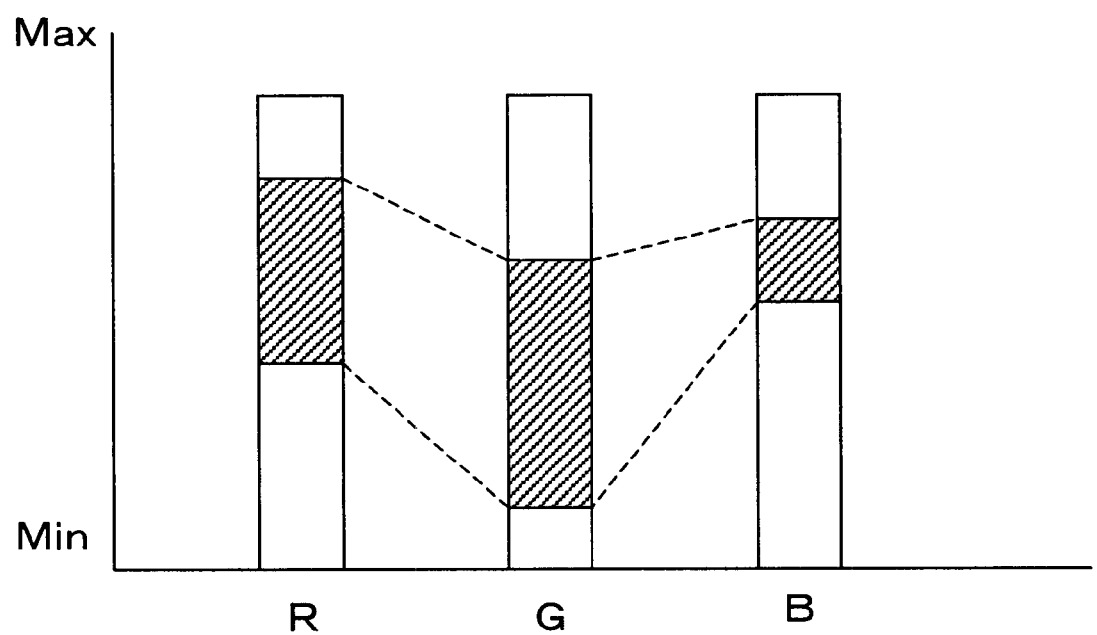
FIG. 13 shows parameters for specifying the color range in RGB format.

According to chroma-key image compositing, soft key chroma-keying is employed in which the subject image is cut out based on the color difference with the predetermined photographed background color. This predetermined color is specified based on RGB and HSV formats. FIG. 13 shows parameters for specifying the color range of the predetermined background color an in an RGB format.

Generally, the color ranges in an RGB format can be determined manually for respective RGB. The ranges are determined within color ranges without the maximum and minimum R (Red) values, the maximum and minimum G (Green) values, and the minimum B (Blue) value.

Referring to FIG. 13, the color range specified for Red has darker graduation than those of Green and Blue. The color range for Green is wide including light graduation whereas the color range for Blue is narrow with darker graduation. These color ranges may vary according to the color of the subject to be cut out.

For chroma-keying, the subject image to be cut out is most clear when the farthest color from the color of the subject is used for the back screen. This back screen color varies depending on the skin color of individual subject. For example, when the subject has a yellow skin, blue back screen is selected. In this case, with a blue back screen (preferably (0, 0, 225)), colors in the color ranges around RGB=(0, 0, 255) are erased.

The RGB format requires no conversion since usually image data is in an RGB format. The drawback of the RGB format is that when the color distribution of the back screen is large, the RGB color ranges need to be wide in which case it may result in an unexpected erasing of, for example, subject's clothing or skin.

Figure 14:
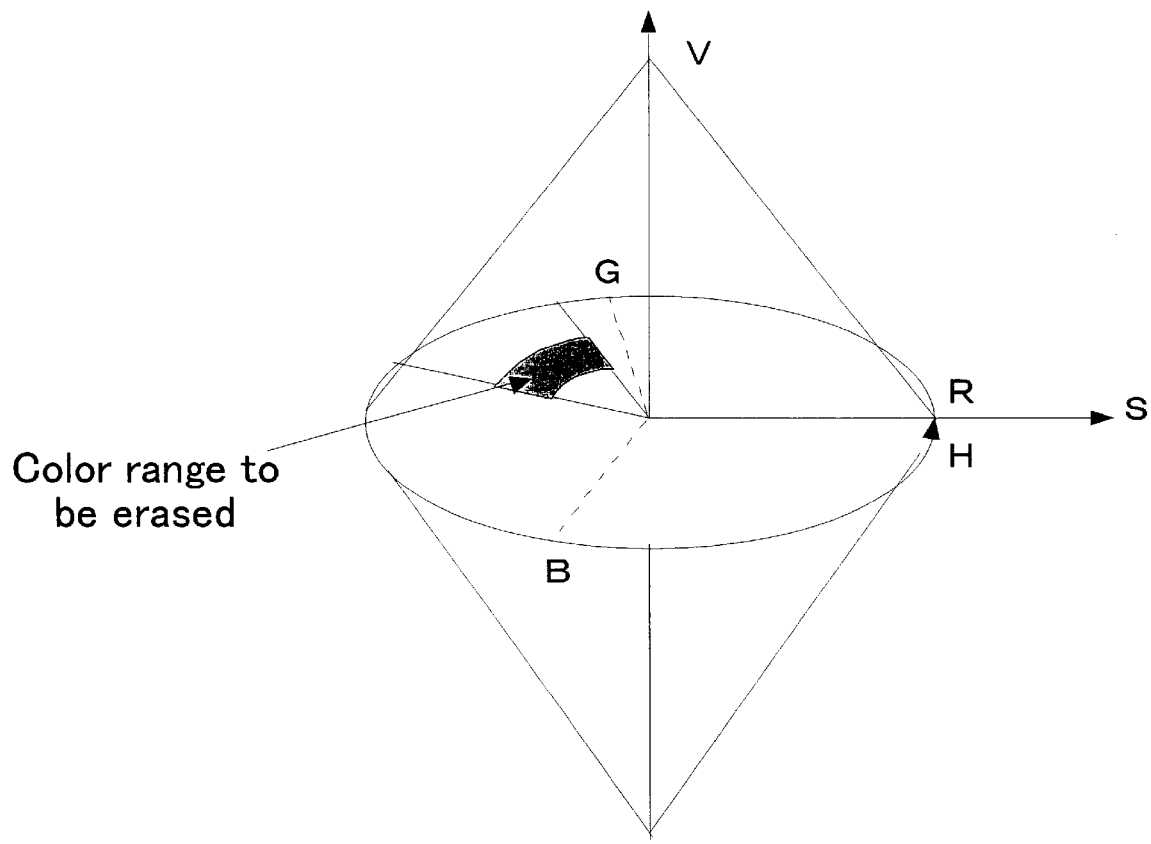
FIG. 14 is a general diagram illustrating an HSV format.

FIG. 14 is a general diagram illustrating an HSV format.

The HSV format represents a color in three variables, H (hue), S (saturation) and V (value, i.e., brightness). H, S and V are independent variables. Referring to FIG. 14, the HSV values become lower as they get farther from the center, i.e., H (hue) and S (Saturation) become lighter and V (brightness) becomes darker. In the HSV format, the color changes in a sequential manner. Accordingly, even when the color ranges of the back screen color to be erased is made wider, only bluish colors will be erased leaving yellow and red colors that are not directly sequential with blue.

The drawback of the HSV format is that there is a need of time-consuming conversion of the format from/into the generally employed RGB format. When the image data is in a JPEG format, the blocks resulting from JPEG compression give influences to the color.

According to the present invention, the subject image is extracted by specifying the color of the original background image in either the RGB or HSV format. Most preferably, the better format is selected according to the colors of individual subjects. Practically, the RGB format is employed to extract the contour of the subject image.

Hereinafter, the way of matching (i.e., adjusting) the hues, the saturation and the brightness between the subject image and the selected background image (condition (iii)) will be described.

FIG. 15A is a histogram showing the distribution of the brightness of the selected background image; FIG. 15B is a histogram showing the distribution of the brightness of the subject image.

As can be appreciated from FIGS. 15A and 15B, the brightness distributions of the two images does not match. Whereas the brightness of the selected background image is uniformly distributed (FIG. 15A), the brightness of the subject image shows a concentrated distribution (FIG. 15B) This concentrated distribution occurs since the subject image mainly consists of a bright face color.

In order to match the brightness distribution of the subject image to that of the desired background image, function f(x) (FIG. 16B) is obtained based on the center point of balance and deviation of the histogram of the desired background.

FIG. 16A is a histogram of the subject image before the brightness transformation; and FIG. 16C is a histogram of the subject image after the brightness transformation with transformation function f(x). It can be appreciated that the brightness distribution of the subject image is influenced by that of the desired background image.

FIGS. 17A and 17B show different functions for transforming brightness distributions. These functions are automatically generated according to each distribution of the background image. FIG. 17A shows a function for uniformly distributing the brightness for the entire scale; and FIG. 17B shows a function that does not transform the brightness distribution for scales higher than a certain scale.

Hereinafter, the adjustment of the saturation will be described.

When the desired background image consists of vivid colors, the background image and the subject image is converted into the above-described HSV format to obtain the average values of their S (saturation). When the average value of S of the subject image is lower than that of the background, the S value of the subject image is raised, and then converted into an RGB format.

Figure 18A:
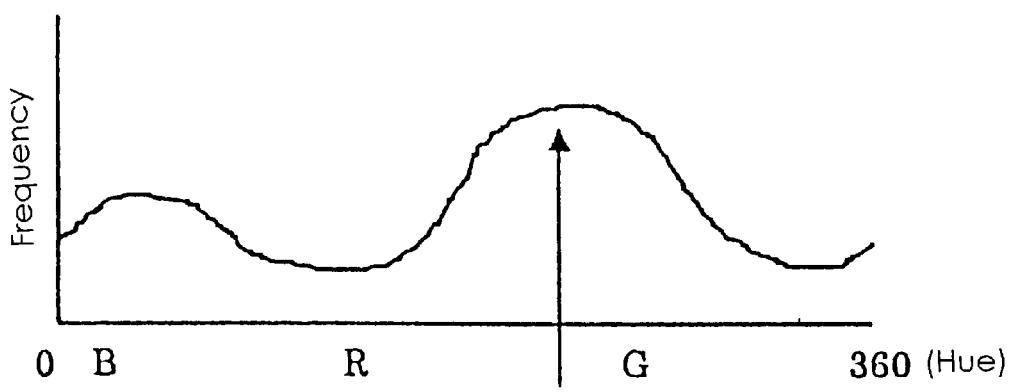
FIGS. 18A and 18B are diagrams for illustrating an exemplary hue transformation.
Figure 18B:
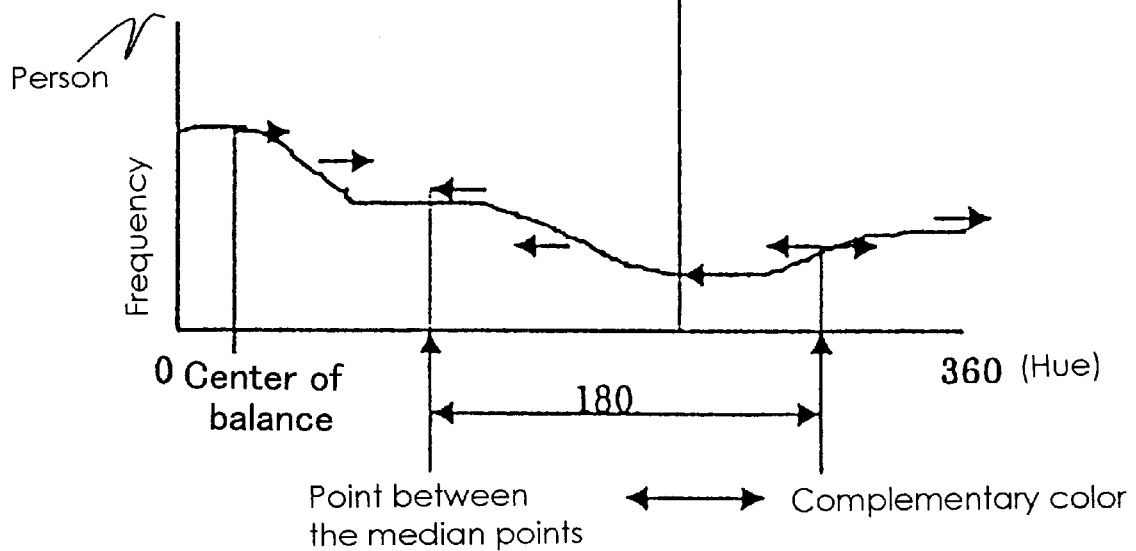

With reference to FIGS. 18A and 18B, hue transformation with data in the HSV format will be described.

First, center points of balance on the color histograms of the subject image and the background image are obtained. Referring to FIG. 18A, the center points of balance of the background image is in the vicinity of Green, meaning that the composite image looks most realistic when the subject image tinged with such green color.

Since Blue and Green are outstanding over Red in the case of FIG. 18A, only the center points of balance of Blue and Green are considered in FIG. 18B. A color complementary to a color in the middle of the center points of balance of B and G (also referred to as "a color at the middle point") is obtained (see FIG. 18B). A color that is between the color at the middle point and the complementary color thereof, and that is in the vicinity of the center point of balance of the background image is the most suitable color used for influencing the subject image. Finally, the subject image is tinged with the obtained color.

Figure 12:
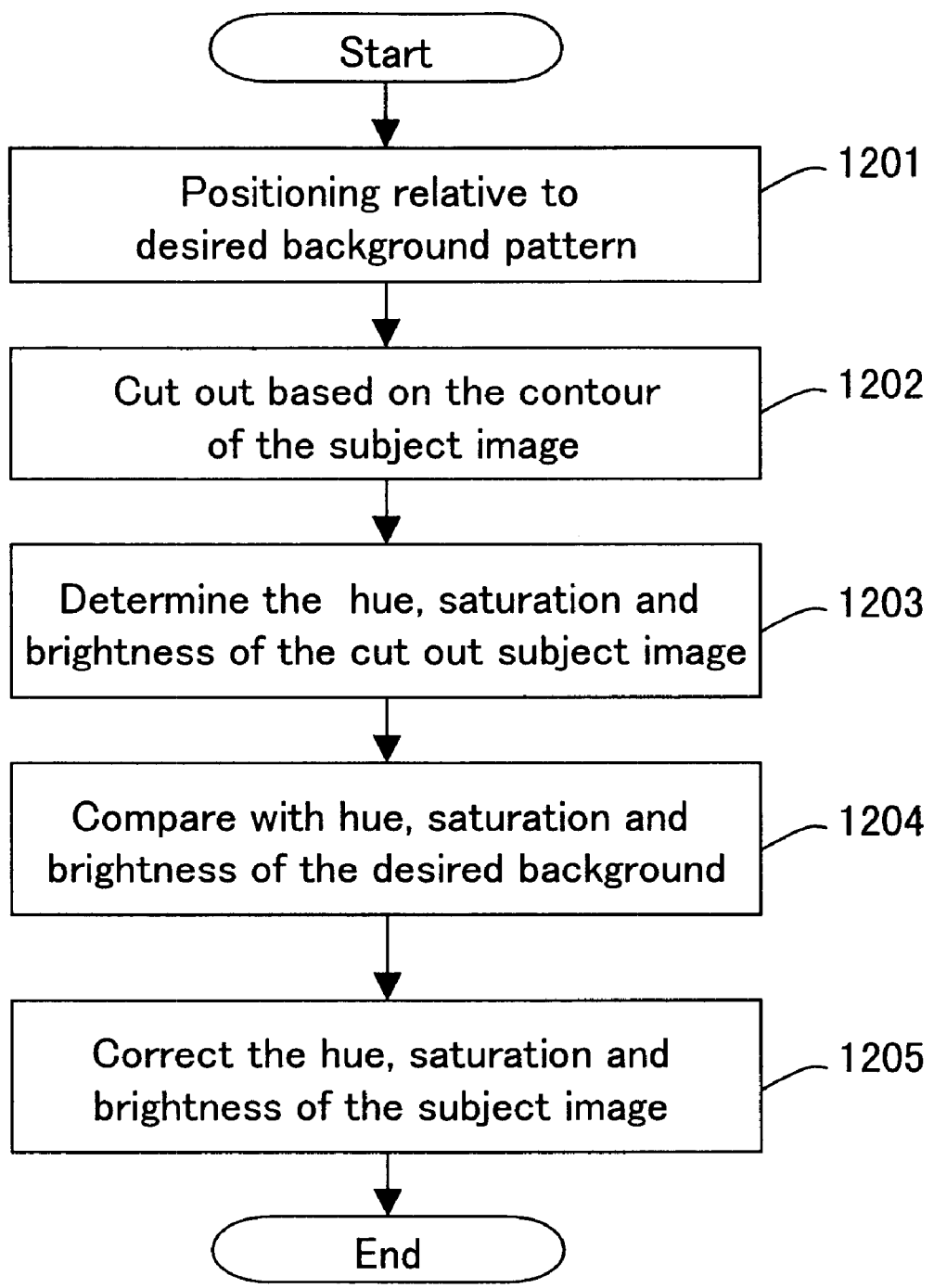
FIG. 12 is a flow chart illustrating steps for compositing an image according to the invention.

When the subject image is cut out at step 1202 in FIG. 12, part of the original background is sometimes left uncut. The original background is likely to remain:

(i) in the vicinity of the contour of the subject person; and (ii) where a dark shadow cast.

These may be due to the facts that shadow is likely to cast in the vicinity of the contour of the subject and that the borderline between the subject and the back screen consists of a color that is different from both of the colors. If the range of the cutout color is made wider, colors that are similar to the back screen color (for example, navy is likely to be erased when the back screen color is blue) are more likely to be erased.

The borderline with an unexpected color between the subject image and the background image (e.g., orange borderline between blue and yellow images) results from optical characteristics of the camera. This problem cannot be solved by merely adjusting the lighting conditions, and thus the following correction is necessary.

Herein, in order to eliminate noise, i.e., the borderline in the image, the edge of a binary masking layer used for chroma-keying is expanded or contracted for a few pixels before being erased.

The expansion/contraction algorithms for noise elimination will be described with reference to FIGS. 19A and 19B.

Figure 19A:
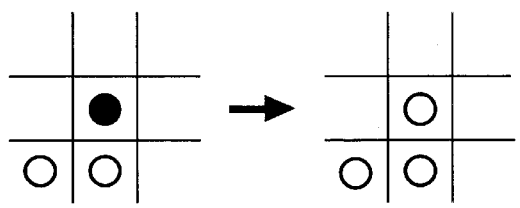
FIGS. 19A and 19B are diagrams for illustrating the expansion and contraction algorithms, respectively, for noise erase.

The expansion is shown in FIG. 19A in which the target pixel is rewritten into a white pixel if there is at least one white pixel in the surrounding eight pixels (FIG. 19A). On the other hand, the contraction is shown in FIG. 19B in which the target pixel is rewritten into a black pixel if there is at least one black pixel in the surrounding eight pixels.

Figure 20A:
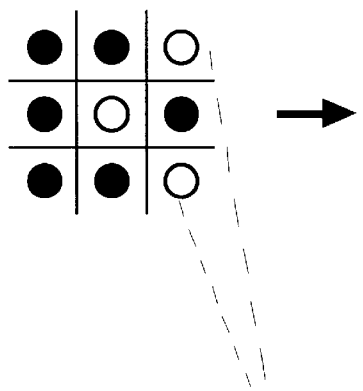
FIGS. 20A and 20B are diagrams for illustrating alternative processing for erasing noise based on the surrounding pixels.
Figure 20B:
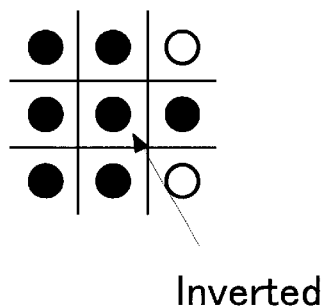

FIGS. 20A and 20B show alternative processing for eliminating noise in which a target pixel is inverted according to the surrounding area. Specifically, the number of the attributes (i.e., white or black) of the eight pixels surrounding the target pixel are counted. When the number of the surrounding pixel with the same attribute as that of the target pixel is equal to or lower than a prescribed number (i.e., a predetermined threshold), the target pixel is inverted, thereby expanding the contour. By performing this processing for the entire image, noise can be eliminated.

Figure 19B:
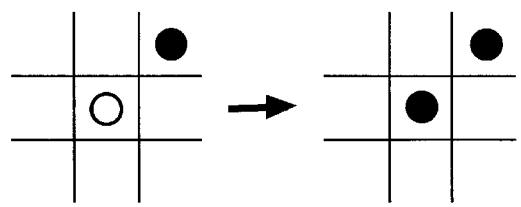

The inversion of pixels based on the process shown in FIGS. 20A and 20B takes shorter time for processing, while the expansion/contraction algorithm shown in FIGS. 19A and 19B is superior in eliminating noise. According to process shown in FIGS. 20A and 20B, a large threshold value may cause a phenomenon where the pixels are serially erased, resulting in an unnatural image. The expansion/contraction algorithms shown in FIGS. 19A and 19B give a more round and natural contour.

Figures 21A, 21B:
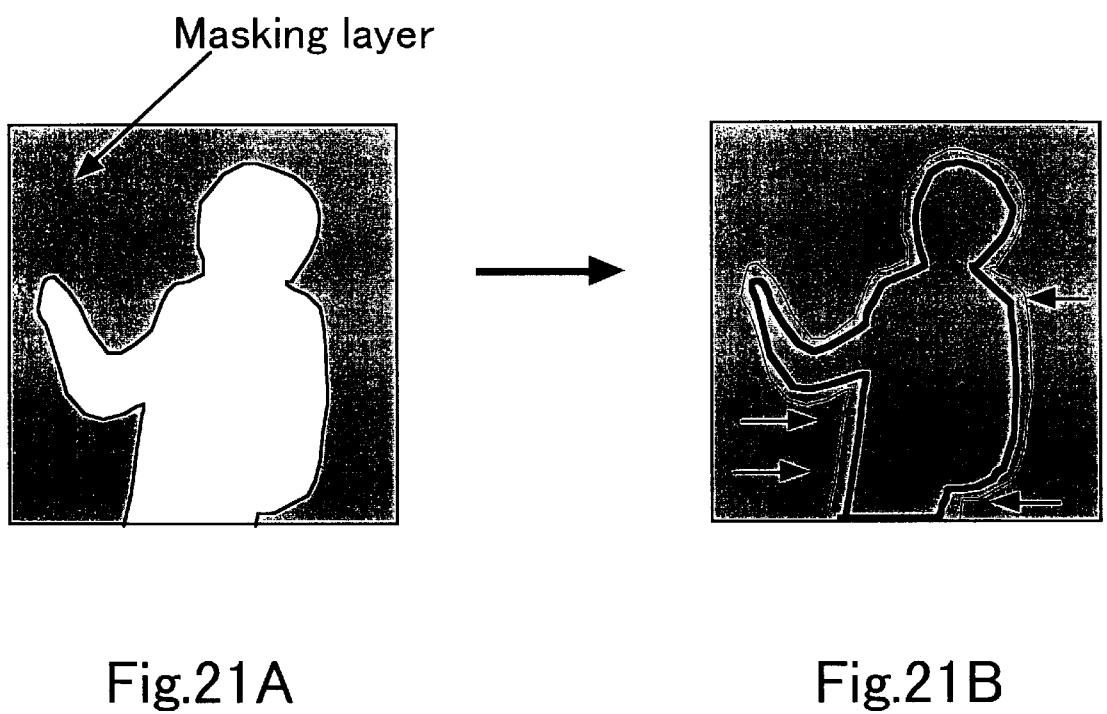
FIGS. 21A and 21B are diagrams for illustrating the steps for extracting the contour of the subject image.

FIGS. 21A and 21B illustrate that the edge of the binary masking layer on the background image is expanded before being erased.

According to the present invention, as described with reference to FIGS. 19A, 19B, 20A and 20B, the contour of the subject image is traced to produce a binary masking layer. The masking layer on the background image is then expanded by 1 to 4 pixels so that the contour covered with the masking layer is erased, thereby preventing the background image from remaining upon chroma-keying.

Figure 22A:
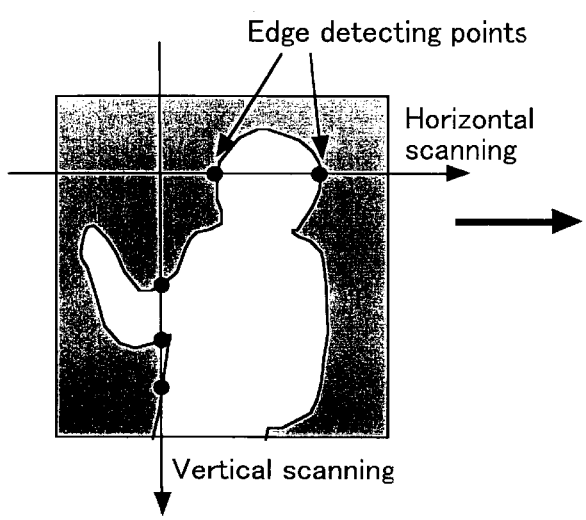
FIGS. 22A and 22B illustrate the steps for blurring the contour of the subject image.
Figure 22B:
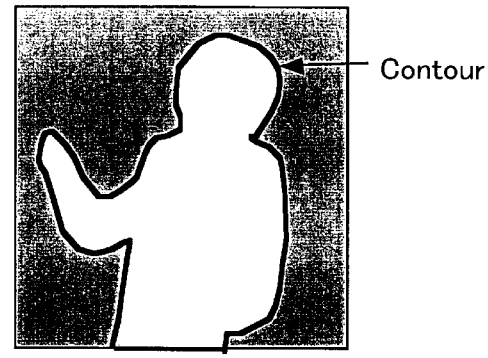

FIGS. 22A and 22B show the way of blurring the contour of the subject image (Condition (iv)). Due to lens aberration, the optical differences of the colors and brightness between the subject image and the background image cause so-called "jaggedness" phenomenon where the borderline between the images consists of unrelated color.

According to the present invention, the contour of the subject image is expanded by conducting masking processing to the contour area as shown in FIGS. 22A and 22B. Specifically, a masking layer is produced for the contour area. The mask image is scanned in both vertical and horizontal directions to find the signal change to write edge information thereto (where the image of the contour is read). The term "edge" as used herein means that there is a significant difference in terms of the gray level distribution with the neighboring area. The contour is passed through a 5×5 smoothing filter and given a blurred effect. The 5×5 smoothing filter replaces the value of the target pixel with the average value of the eight nearest pixels (as shown in FIGS. 20A and 20B). Since the edge to be detected is only 1 pixel wide, the effect of blurring the edge is not significant. Therefore, the edge is expanded to 3 pixels as described above before being subjected to the smoothing filter.

The smoothing filter blurs the contour, thereby eliminating the jaggedness.

When the background image has a strong color like green, red and yellow, it is more realistic if the subject image had the effect of that color. The effect of the color of the background image on the subject image may be obtained by a hue correction based on the parameters of the hue of the desired background image obtained from the RGB histogram.

Figure 23:
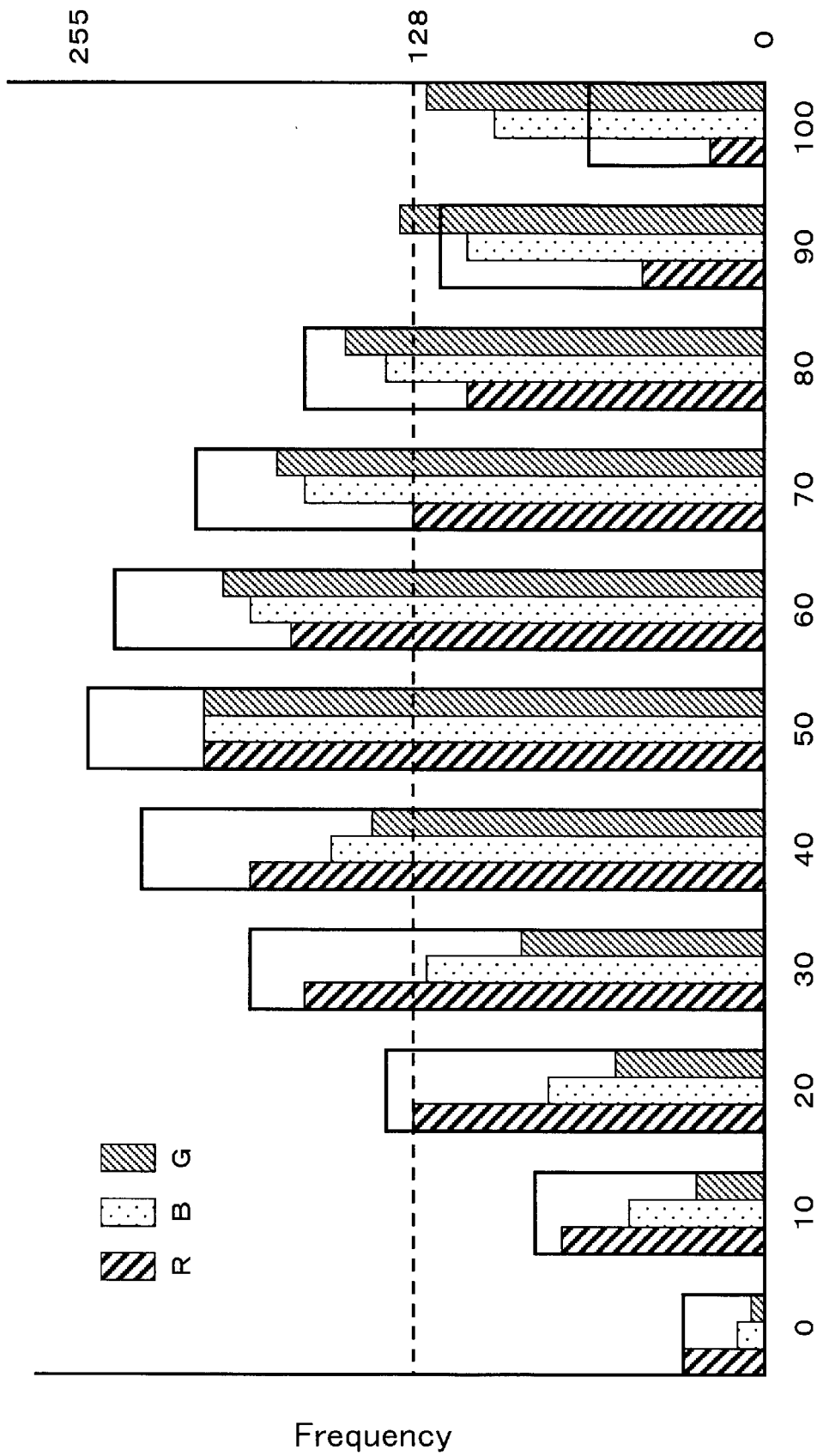
FIG. 23 is an RGB histogram (0–225, 256 levels) of a color of the background image.

First, an RGB histogram (0–225, 256 levels) of the most predominant color of the background image is prepared (FIG. 23). The vertical axis represents frequency of each of the RGB and the horizontal axis represents the assigning intensity levels of all hue where the color becomes brighter toward right.

Figure 24:
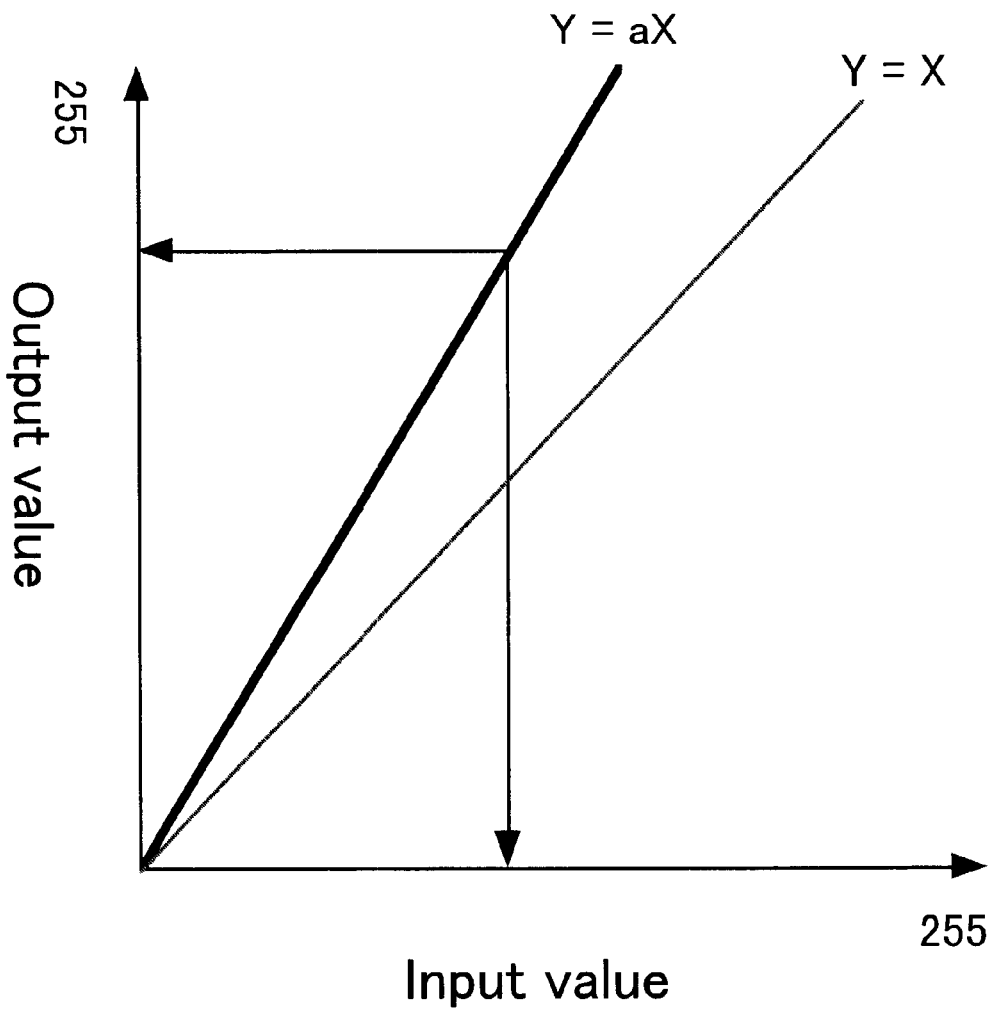
FIG. 24 shows a function for transforming the hue of a subject image.

The frequencies over 128 are counted to obtained the center position p of the histogram. Then, the transformation function for the RGB is determined. FIG. 24 shows a primary function Y=aX for transforming the hue of the image.

Slope a of the line shown in FIG. 24 can be represented as follows:

$$a=p/B$$

where B represents a variable as a standard value for the transformation; and p represents the center position for the histogram exceeding level 128.

Colors (RGB) having a medium value that exceeds the variable B shift to the right. The slope a (i.e., the coefficient a) has upper and bottom limitations in order to avoid an extreme color correction. Extreme color correction will have a great influence on the color of the subject image, rendering the resultant compositing image unnatural.

Hereinafter, the operation procedure of the image compositing apparatus 300 of the invention will be described with reference to FIGS. 25 to 30.

Figure 25:
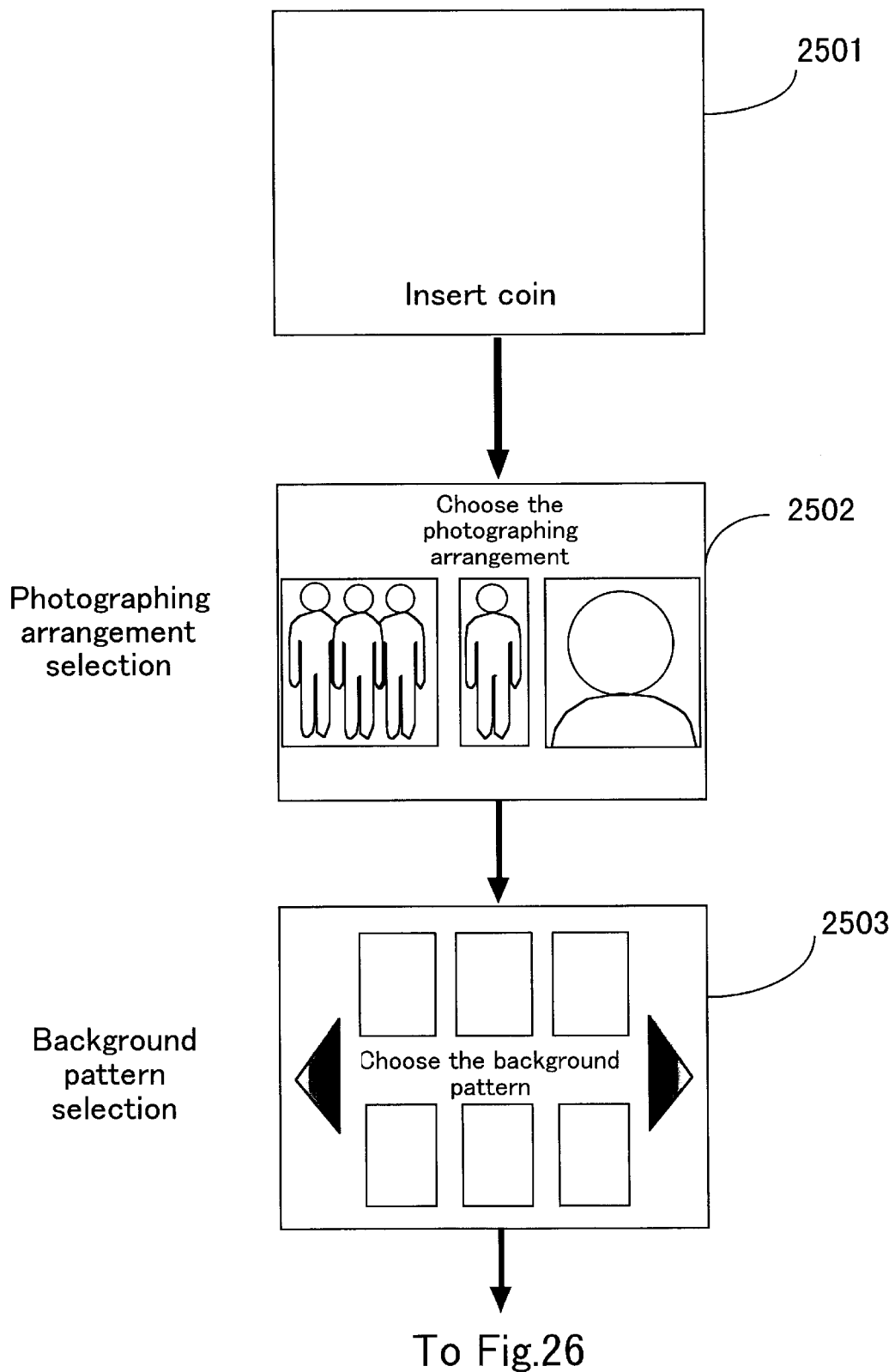
FIG. 25 is a schematic view showing a series of screens displayed on the image compositing apparatus of the invention.

FIG. 25 is a schematic view showing a series of screens displayed on the apparatus 300.

While the display 307 runs a demonstration screen, the apparatus 300 is in a waiting state ready to receive coins (step 2501). Instead of the demonstration screen, music or a message may be run saying that the machine is currently not in use.

Once the user inserts a predetermined amount of coins (medals used in amusement arcades), the selection screen is displayed (step 2502). According to the present invention, the user needs to select whether there are numbers of subjects, whether the user wishes a whole body picture, or whether the user wishes a from-a-waist-up picture. Then, the background patterns such as an undersea image, sight spots around the world and scenes from a film are displayed. The plurality of background patterns may be displayed and selected by scrolling the screens with right and left buttons (step 2503). The apparatus 300 of the invention may be provided with a digital camera I/F so that the user may be able to connect his/her own digital camera to upload his/her own image to be used as the background pattern.

Figure 26:
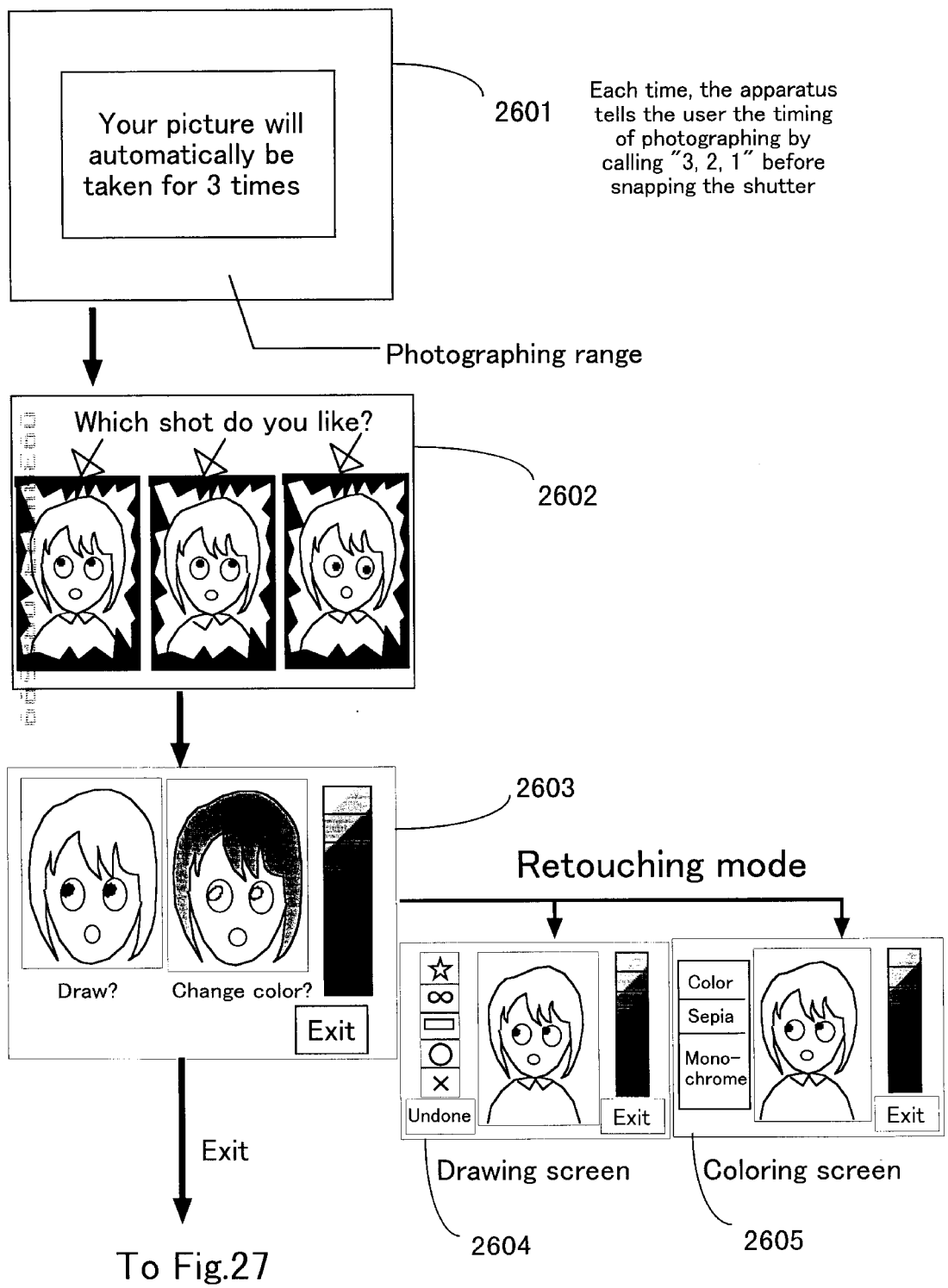
FIG. 26 is a schematic view showing a series of screens displayed on the image compositing apparatus of the invention.

FIG. 26 is a schematic view showing a series of screens displayed on the apparatus 300 for the photographing step. After selecting the background pattern in FIG. 25, the screen switches to a photographing mode and displays the subject (user) through the CCD camera 303 (step 2601) At this step, the background pattern selected by the user at step 2504 in FIG. 25 is displayed on the screen and the subject may adjust his/her standing position with the background pattern. The photographs are automatically taken for three times from which the user selects the best shot (step 2602). Then, the screen shifts to a retouch mode for coloring the selected image or for typing/drawing characters/figures on the selected image (steps 2603, 2604 and 2605). If the user wishes not to retouch the image, this retouch screen may be skipped and the screen may be directly switched to the inputting mode. On the coloring screen, the color tone of the image may be changed into color, sepia or monochrome tone. The drawing screen not only allows the user to draw on the image but also allows to type in characters.

Figure 27:
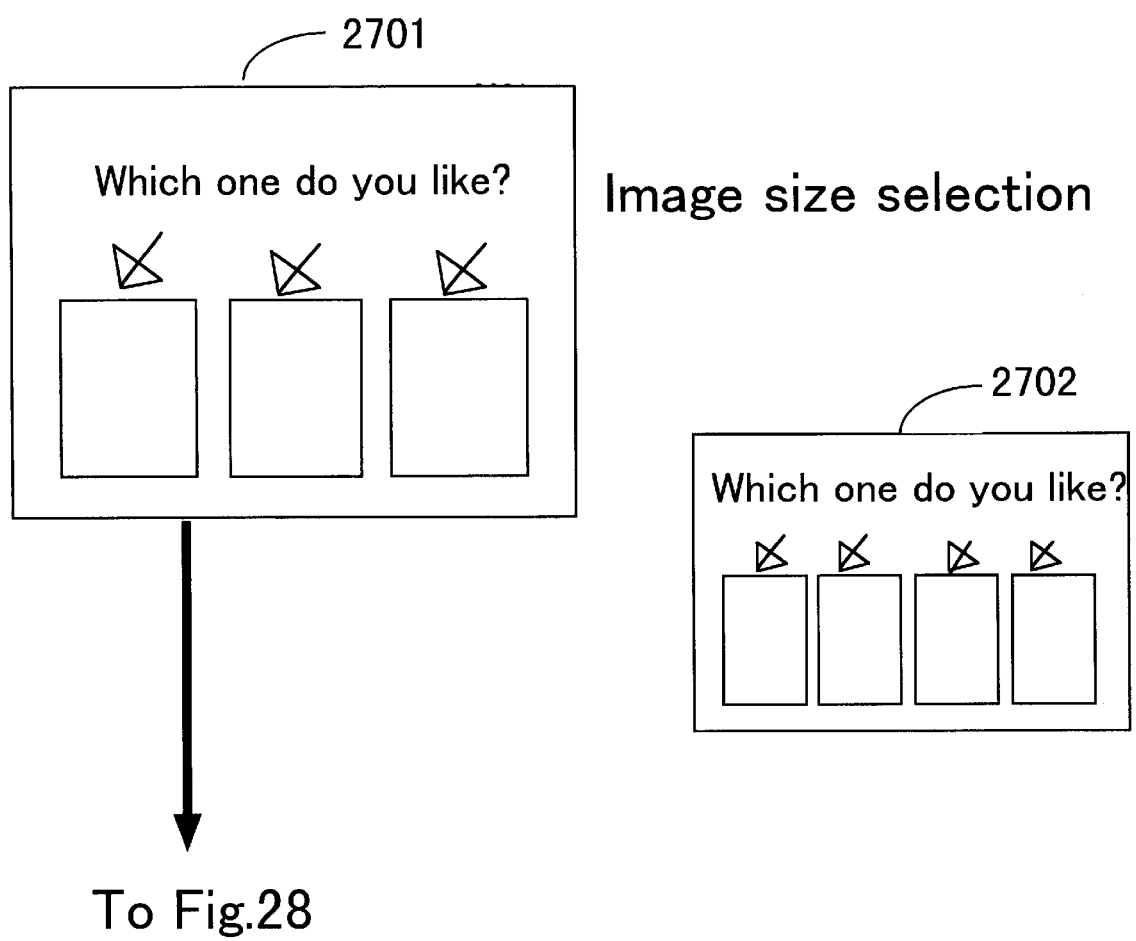
FIG. 27 is a schematic view showing a series of screens displayed on the image compositing apparatus of the invention.

FIG. 27 shows a screen for selecting the outputting size. The user may select the size of the image (steps 2701 and 2702). When the image is printed out in the form of post cards or the like, the width and the height of the image may be specified by the user.

Figure 28:
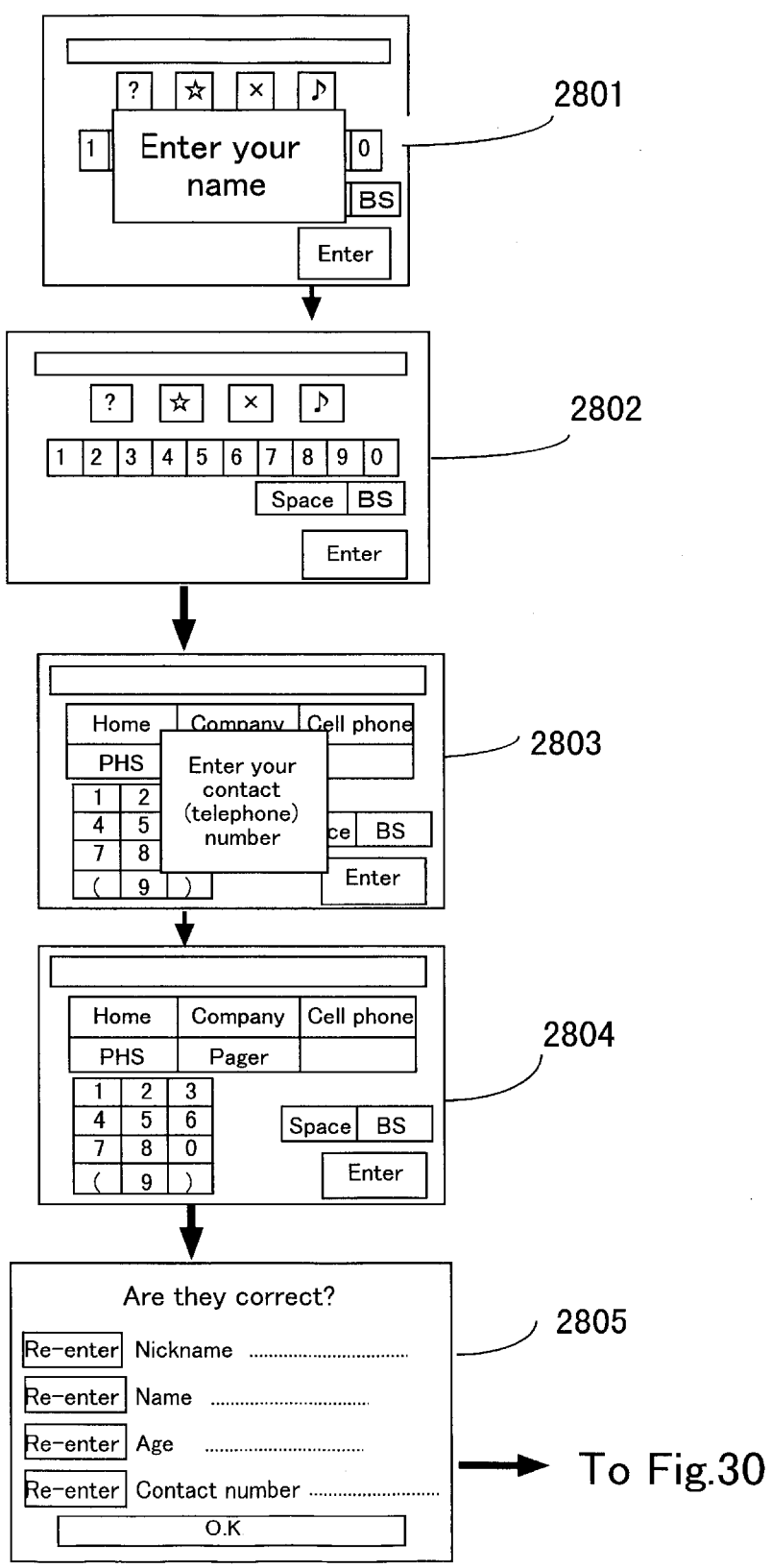
FIG. 28 is a schematic view showing a series of screens displayed on the image compositing apparatus of the invention.

FIG. 28 is a schematic view showing a series of screens displayed on the apparatus 300 showing how to input personal information of the user. First, the user is asked to enter his/her name and nickname (step 2801), then his/her age (step 2802), and his/her phone number as well as the type of the phone (cell phone, PHS, etc.) (steps 2803 and 2804). Whether or not to answer to the questions of these screens is at user's discretion. The user may skip the questions if he/she does not want to answer to them.

Then, the user is asked to confirm the information that he/she has entered (step 2805).

The age information may be used for designing new backgrounds and frame patterns by analyzing the ages of the user at various areas.

Figure 29:
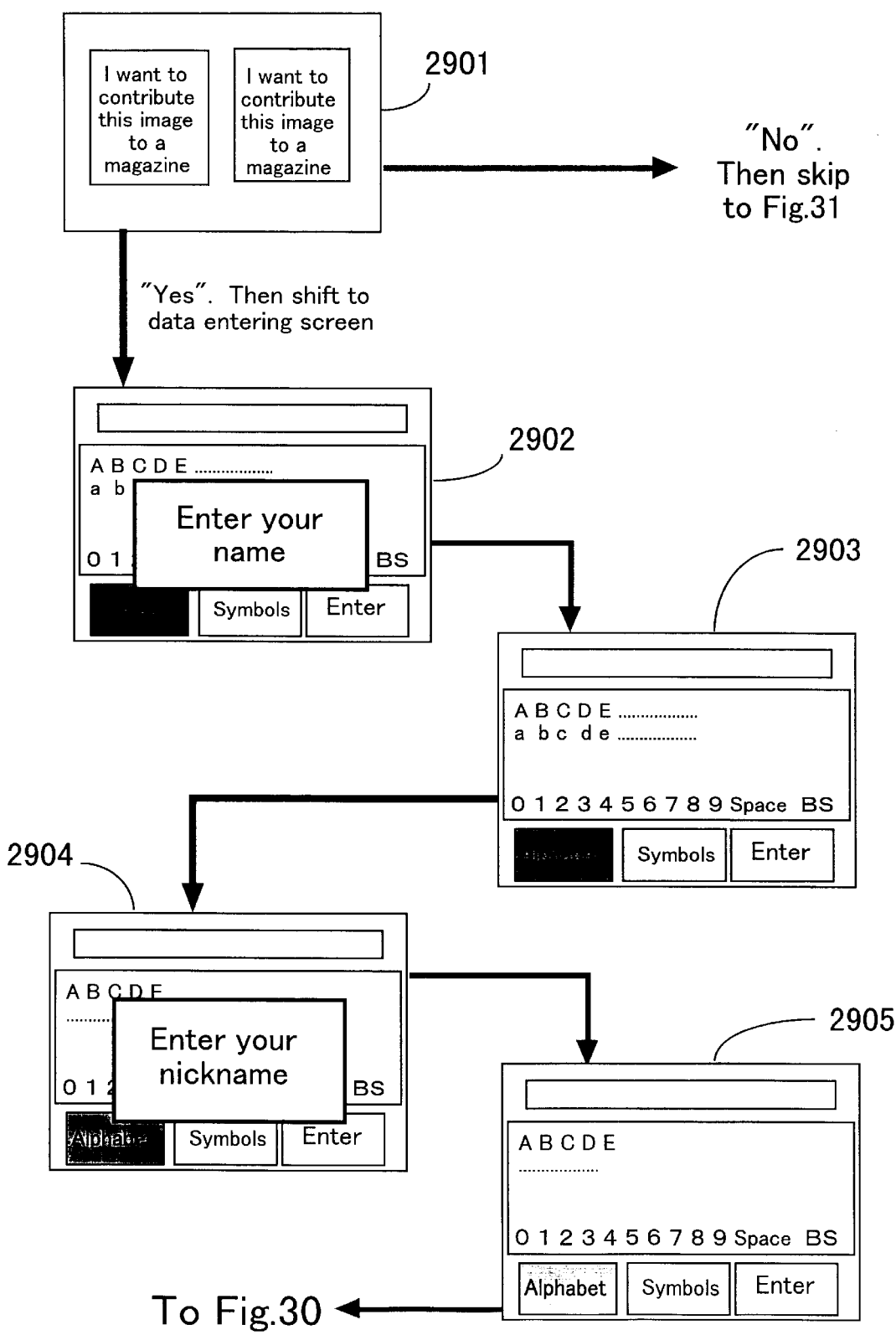
FIG. 29 is a schematic view showing a series of screens displayed on the image compositing apparatus of the invention.

FIG. 29 is a flow chart of obtaining the user's approval of using his/her image in a magazine.

First, the user is asked if he/she would like to contribute his/her image to a magazine (step 2901). If the user says "no" the screen switches to a printing mode.

If the user wishes to contribute his/her image to a magazine, he/she is asked to enter his/her personal information (step 2902). Since the image is contributed to a magazine the user is required to type in his/her real name (step 2903). Then, he/she is asked to enter his/her nickname (step 2904 and 2905).

Figure 30:
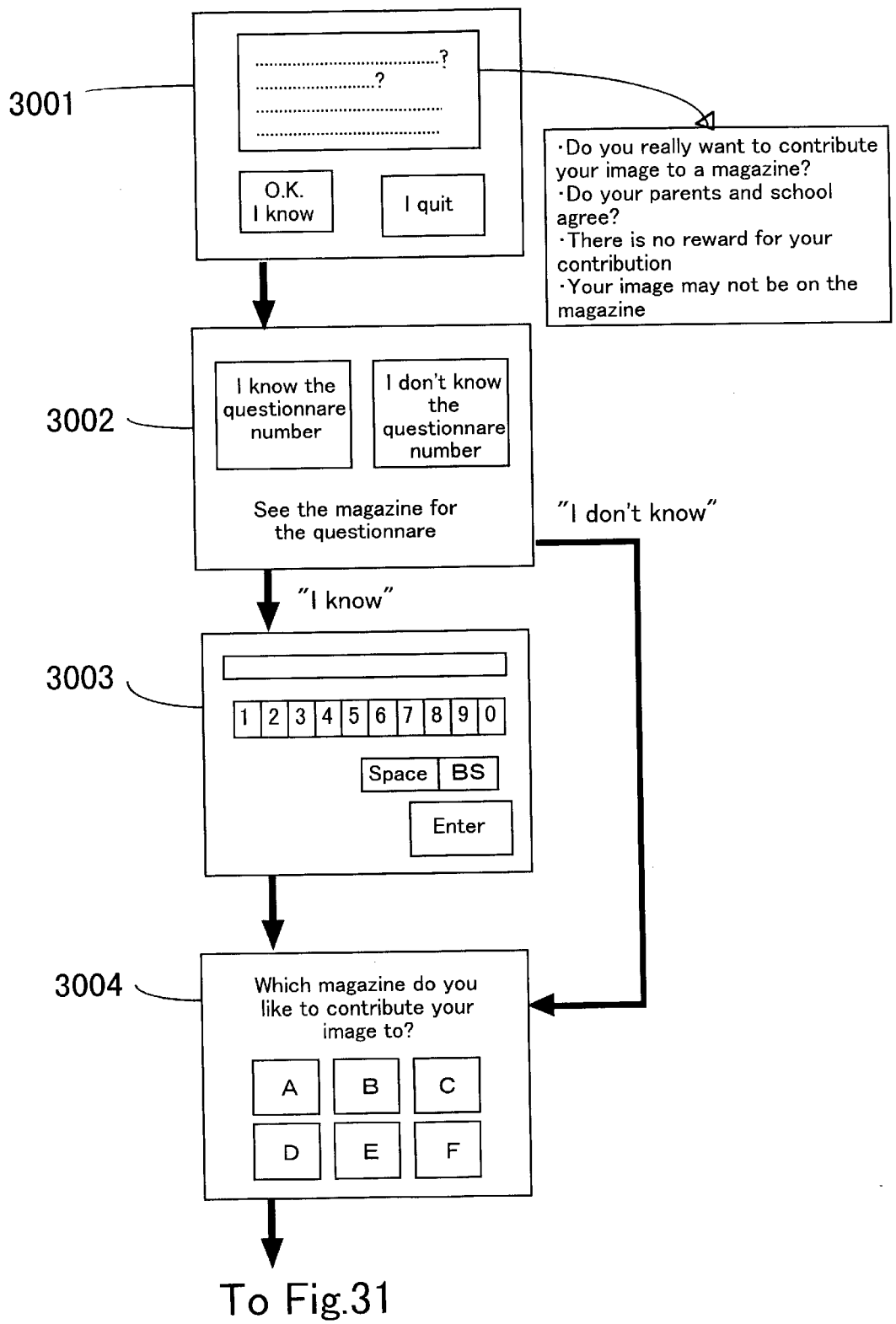
FIG. 30 is a schematic view showing a series of screens displayed on the image compositing apparatus of the invention.

FIG. 30 is a schematic view showing a series of screens displayed on the apparatus 300.

Again, the user is asked whether they approve his/her image to be contributed to a magazine (step 3001). This is to remind juvenile users that they may need permission of their parents or schools.

Then, the user is asked whether or not they know the questionnaire number (step 3002). If he/she knows, he/she is to answer the questionnaire by entering the number (step 3003). Then, the user is asked to select the magazine that he/she wants to contribute his/her image to (step 3004), and proceeds to the printing screen.

Figure 31:
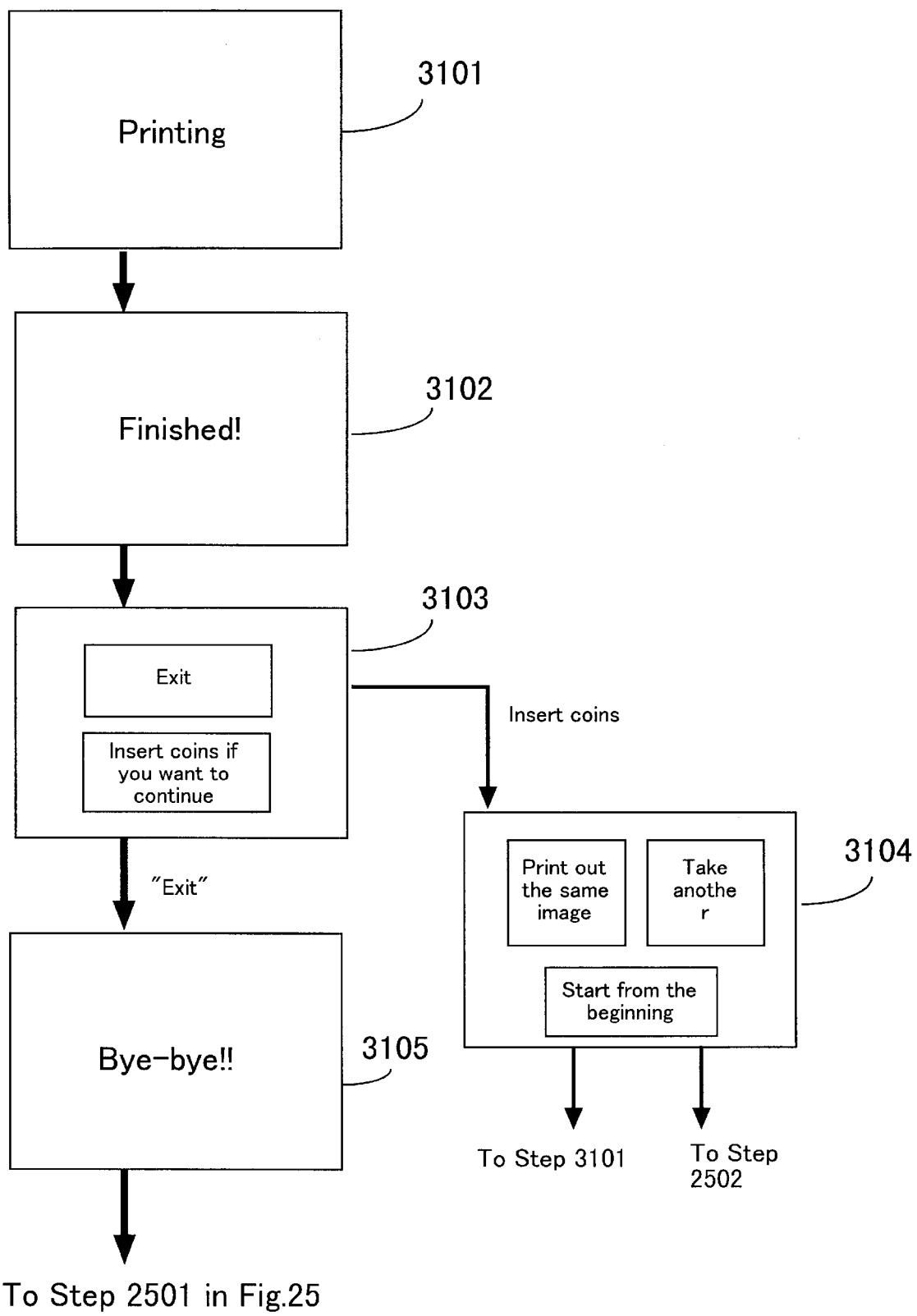
FIG. 31 is a schematic view showing a series of screens displayed on the image compositing apparatus of the invention.
Figure 32:
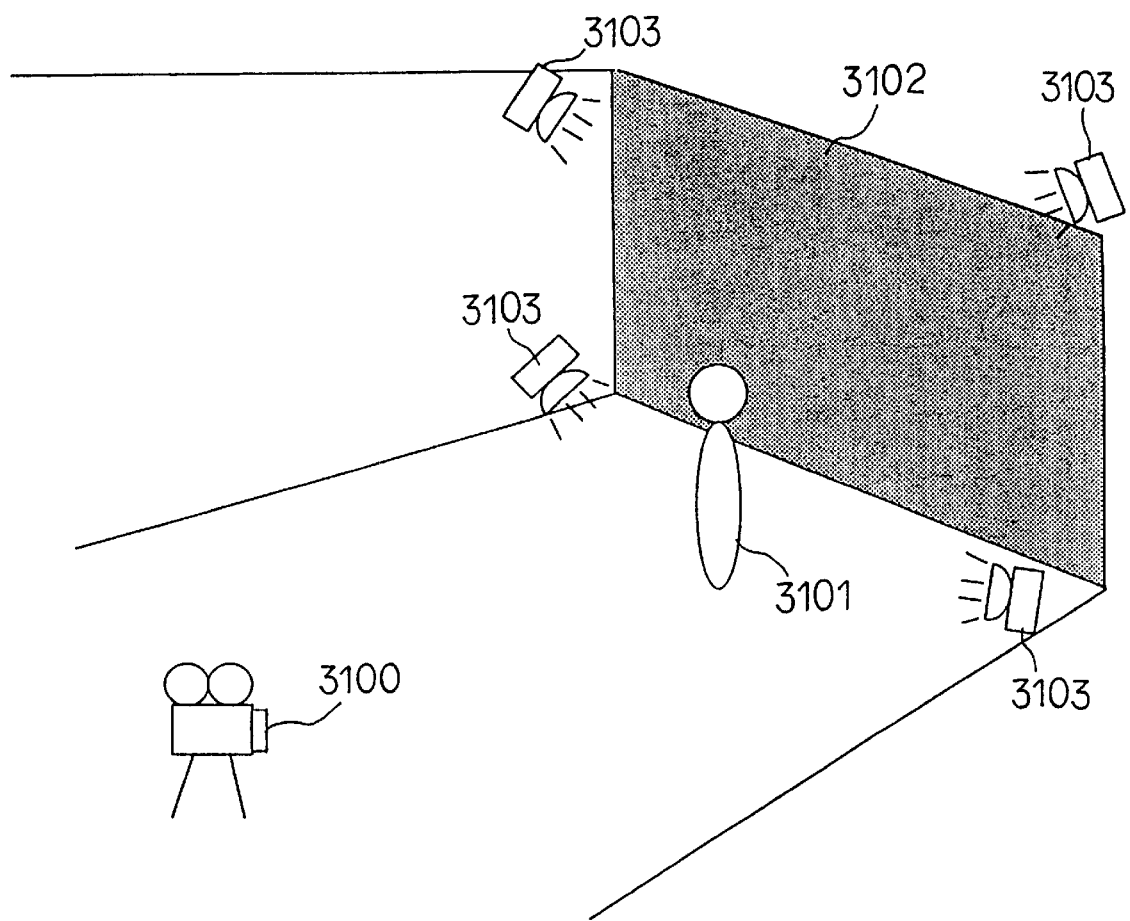
FIG. 32 is a pictorial view showing the general positional relationship of light sources.
Figure 33:
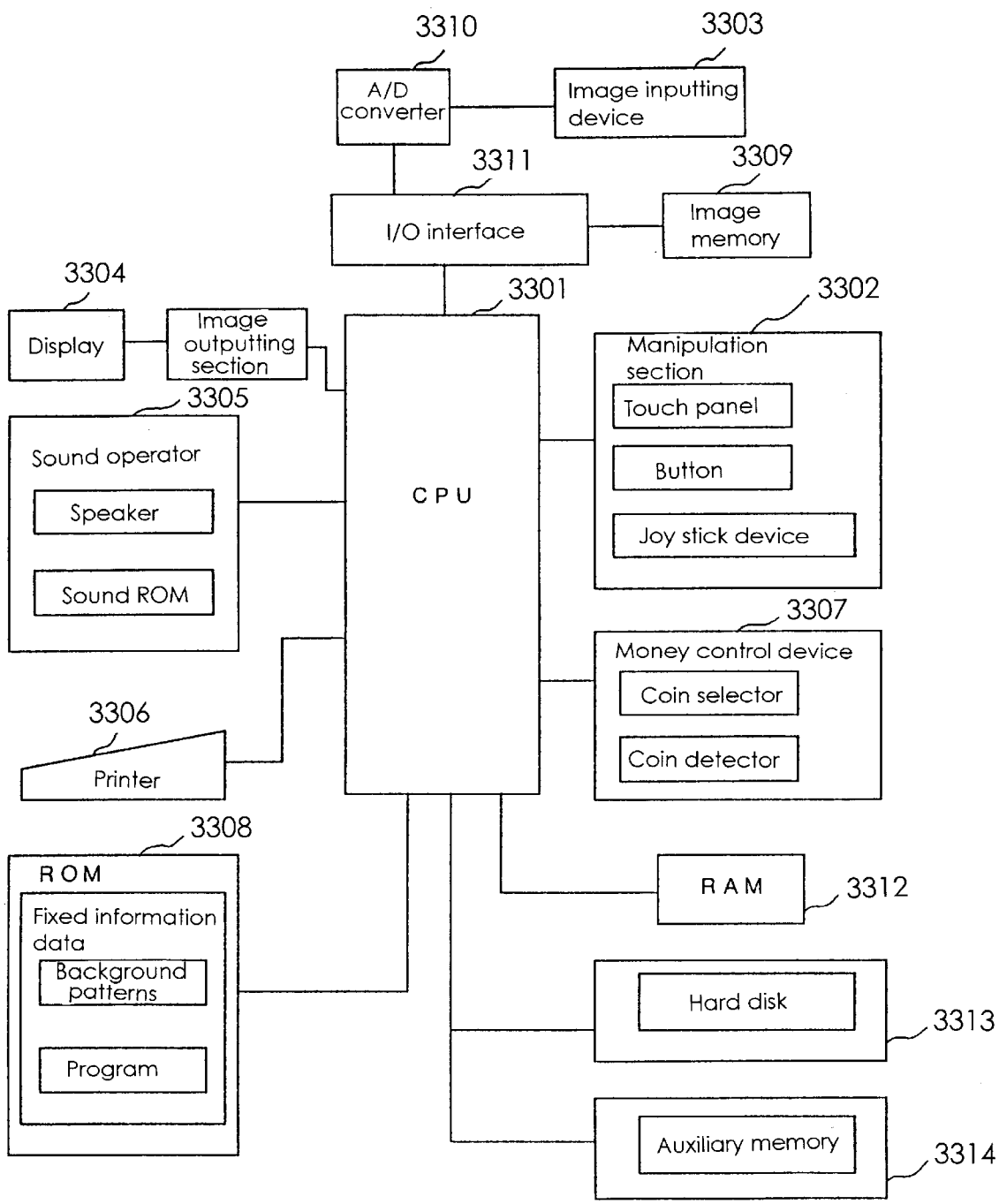
FIG. 33 is a block diagram showing a configuration of one of conventional image printing apparatuses.

FIG. 31 is a schematic view showing a series of screens displayed on the apparatus 300. When the apparatus 300 is printing the composite image, the screen displays a message such as "printing"(step 3101). During this process, characters or commercial announcements may be run behind this "printing" message. When the printing process completes and the composite image is printed out on a postcard or stickers, a message such as "Finished!" is displayed on the screen or such message may be announced in sound (step 3102). Then, the user is asked if he/she would like to continue using the apparatus (step 3103). This screen is displayed for a predetermined period, for example, with a countdown. The user may select "Exit" if he/she does not wish to use the apparatus any more. If the user wishes to continue to use the apparatus, he/she has to insert additional coins during the countdown. Then the user is to select whether he/she wants a copy of the same image or take a new picture for another image (step 3104).

At the end of the process, the apparatus informs the user that the printing out has been completed and tells that every process has finished (step 3105).

Although the composite image is printed on a printing paper in the above example, the present invention is not limited thereto.

For example, the structure of the invention may be applied to a small film studio, a studio at school, or the like where there is no enough space for making a shadow-free environment for image compositing.

According to the present invention, image compositing is accomplished by providing luminous members behind a subject and on the floor, and light sources in front of the subject, thereby eliminating the shadow of the subject. Thus, a realistic composite image can be obtained in a limited space with a simple structure.

Since the light of the flat luminous boards behind the subject and on the floor has a constant saturation, the color range of the original background image can be specified. Accordingly, even if the subject image includes a color similar to the back screen, efficient image compositing is possible.

The illuminance of the flat luminescent boards may be adjusted according to various exposure conditions. This may also be advantageous to minimize the amount and the range of the key color of the back screen and the floor reflected on the subject.

The hues, saturation and brightness of the subject image and the background pattern may be corrected so that the subject image is blended into the background pattern to give a realistic composite image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

All publications, including patent and patent application cited herein are incorporated herein by reference in their entirety.

What is claimed is:

1. An image compositing apparatus provided with a fare adjustment function comprising:

light panels provided behind a subject and on a floor, which uniformly emit uniform light with predetermined hue, saturation and brightness distributions;

a means for measuring the hue, saturation and brightness distributions of the light panels provided behind the subject and on the floor;

a memory for memorizing the hue, saturation and brightness distributions of the light panels provided behind the subject and on the floor;

an image extracting means for extracting a foreground image of the subject based on a color of the light panels behind and underneath the subject;

an image compositing means for comparing and correcting hue, saturation, and brightness distributions of the foreground image with respect to hue, saturation, and brightness distributions of a background image, and compositing the foreground image with the background image to provide a composite image; and an image display device for displaying the composite image.

2. An image compositing method comprising the steps of:

providing at least one light panel behind a subject which uniformly emit uniform light with predetermined hue, saturation and brightness distributions;

extracting a foreground image of the subject;

memorizing hue, saturation, and brightness distributions of a background image; and correcting hue, saturation, and brightness distributions of the foreground image with respect to the hue, saturation, and brightness distributions of the background image to provide a composite image.

3. The apparatus of claim 1, further comprising a distortion correcting means for correcting a distortion of the foreground image.

4. The apparatus of claim 1, further comprising a noise eliminating means for eliminating a noise on an edge of the foreground image.

5. The apparatus of claim 4, further comprising a jaggedness eliminating means for eliminating jaggedness of the foreground image by blurring a contour of the foreground image.

6. The apparatus of claim 1, further comprising an image inputting device.

7. The apparatus of claim 6, wherein the image-inputting device comprises one of a CCD camera, C-MOS-loaded camera, a video camera, and a digital camera.

8. The apparatus of claim 1, further comprising a printing device.

9. The method of claim 2, further comprising inputting an image comprising the foreground image.

10. The method of claim 9, wherein the imputed image is photographed, filmed, or downloaded from a data storage device.

11. The method of claim 2, further comprising outputting the composite image.

12. The method of claim 11, wherein the composite image is outputted to a display device, a printer or a data storage device.

13. The method of claim 2, further comprising providing at least one light panel underneath the subject, wherein the light panels uniformly emit uniform light with predetermined hue, saturation and brightness distributions.

14. The method of claim 2, wherein the foreground image is extracted from a photograph or a digital image including the subject.

15. A method for compositing a foreground image of a subject with a background image to produce a composite image comprising the steps of (a) providing light panels that uniformly emit light with a predetermined hue, saturation and brightness behind and underneath the subject;

(b) measuring and storing hue, saturation, and brightness distributions of the foreground image in a memory of a computer;

(c) measuring and storing hue, saturation, and brightness distributions of the background image in a memory of a computer; and (d) correcting the hue, saturation, and brightness distributions of the foreground image with respect to the hue, saturation, and brightness distributions of the background image, thereby compositing the foreground image with the background image to produce a composite image.

16. The method of claim 15, wherein a contour of the foreground image is measured and extracted to correct distortion of the foreground image.

17. The method of claim 15, wherein the composite image is printed out or displayed.

* * * * *